(12) United States Patent
Kondo

(10) Patent No.: US 7,755,701 B2
(45) Date of Patent: Jul. 13, 2010

(54) IMAGE PROCESSING APPARATUS, IMAGE PROCESSING METHOD, AND PROGRAM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1056 days.

(21) Appl. No.: 11/425,907

(22) Filed: Jun. 22, 2006

(65) Prior Publication Data

US 2007/0047830 A1 Mar. 1, 2007

(30) Foreign Application Priority Data

Jun. 27, 2005 (JP) .............................. 2005-185998

(51) Int. Cl.
*H04N 7/01* (2006.01)

(52) U.S. Cl. ...................................... 348/458; 348/441
(58) Field of Classification Search ................. 348/441, 348/446, 448, 458, 459, 452, 451, 443; 382/299–301; 345/660, 667; *H04N 7/01, 11/20*
See application file for complete search history.

(56) References Cited

U.S. PATENT DOCUMENTS

| 6,571,142 B1 * | 5/2003 | Kondo et al. .................. 700/90 |
| 7,071,990 B2 * | 7/2006 | Kondo ......................... 348/383 |
| 2003/0156227 A1 * | 8/2003 | Kondo ......................... 348/714 |

FOREIGN PATENT DOCUMENTS

JP 10-56622 2/1998

* cited by examiner

*Primary Examiner*—Sherrie Hsia
(74) *Attorney, Agent, or Firm*—Oblon, Spivak, McClelland, Maier & Neustadt, L.L.P.

(57) ABSTRACT

An image processing apparatus includes a down-converter and an image converter converting first image data into higher quality second image data. The image converter includes a prediction tap extracting unit extracting, as prediction taps, a plurality of pixels used for predicting a subject pixel of the second image data from the first image data, a class tap extracting unit extracting, as class taps, a plurality of pixels used for classifying the subject pixel from the first image data, a classification unit classifying the subject pixel based on the class taps, a coefficient output unit outputting a coefficient corresponding to a class of the subject pixel from among coefficients, determined beforehand by learning, corresponding to the plurality of classes, and a calculator determining the subject pixel by performing prediction calculations by using the coefficient corresponding to the class of the subject pixel and the prediction taps.

13 Claims, 15 Drawing Sheets

IMAGE PROCESSING APPARATUS, IMAGE PROCESSING METHOD, AND PROGRAM

CROSS REFERENCES TO RELATED APPLICATIONS

The present invention contains subject matter related to Japanese Patent Application JP 2005-185998 filed in the Japanese Patent Office on Jun. 27, 2005, the entire contents of which are incorporated herein by reference.

BACKGROUND OF THE INVENTION

1. Field of the Invention

The present invention relates to image processing apparatuses, image processing methods, and programs, and more particularly, to an image processing apparatus, an image processing method, and a program that enable users to receive high-quality image data.

2. Description of the Related Art

In existing terrestrial analog broadcasting, standard definition (SD) images having an aspect ratio of 4:3 corresponding to composite signals in compliance with the National Television System Committee (NTSC) system are broadcast.

In recent years, in addition to existing terrestrial analog broadcasting, terrestrial digital broadcasting has started. In terrestrial digital broadcasting, SD images having an aspect ratio of 16:9, so-called "D1 images", or high definition (HD) images are broadcast in the form of component signals, and thus, higher quality images can be provided compared to images provided by terrestrial analog broadcasting.

Broadcasting equipment, such as cameras for capturing SD images having an aspect ratio of 16:9 (hereinafter referred to as "D1 images") or HD images, is expensive so that it takes time before such expensive broadcasting equipment will be widely used in broadcasting stations.

Accordingly, in some broadcasting stations, composite signal images to be broadcast in terrestrial analog broadcasting are converted into component signal images, and then, the component signal images are up-converted by increasing the number of pixels by interpolation. With this operation, only the format of the resulting images becomes the same as that of D1 images or HD images, which are broadcast in terrestrial digital broadcasting.

Images having the same format as that of D1 images or HD images by converting composite signal images into component signal images and by up-converting the component signal images are hereinafter referred to as "quasi-D1 images" or "quasi-HD images".

Since quasi-D1 images or quasi-HD images are images generated by converting composite signal images into component signal images, noise, so-called "cross-color" or "dot crawl", occurs in such quasi-images. Also, since quasi-D1 images or quasi-HD images are images generated by up-converting component signal images converted from composite signal images, noise, so-called "cross-color" or "dot crawl", becomes even noticeable by up-conversion. In particular, in quasi-HD images, noise, so-called "cross-color" or "dot crawl", becomes even more noticeable since the number of pixels to be interpolated by up-conversion is larger than that in quasi-D1 images.

A method for converting images into high-quality images by considering the characteristics unique to composite signals has been proposed in, for example, Japanese Unexamined Patent Application Publication No. 10-056622.

SUMMARY OF THE INVENTION

Even though quasi-HD images are broadcast by terrestrial digital broadcasting, it is difficult for the users (viewers) to receive high-quality images by such quasi-HD images because only the format of the quasi-HD images is converted to the same as that of HD images.

Accordingly, there is a need for the users to receive high-quality images.

According to an embodiment of the present invention, there is provided an image processing apparatus for processing first image data to output second image data which has higher quality than the first image data. The image processing apparatus includes down-converting means for down-converting input image data by decreasing the number of pixels of the input image data and image conversion means for converting the first image data into the second image data by using the input image data down-converted by the down-converting means as the first image data. The image conversion means includes prediction tap extracting means for extracting, as prediction taps, a plurality of pixels used for predicting a subject pixel of the second image data from the first image data, class tap extracting means for extracting, as class taps, a plurality of pixels used for classifying the subject pixel into one of a plurality of classes from the first image data, classification means for classifying the subject pixel based on the class taps, coefficient output means for outputting a coefficient corresponding to the class of the subject pixel from among coefficients corresponding to the plurality of classes, the coefficients being determined beforehand by learning, and calculation means for determining the subject pixel by performing prediction calculations by using the coefficient corresponding to the class of the subject pixel and the prediction taps.

The aforementioned image processing apparatus may further include determining means for determining the type of input image data. If the determining means determines that the type of input image data is up-converted image data obtained by up-converting another image data by increasing the number of pixels of that image data, the down-converting means down-converts the input image data by decreasing the number of pixels of the input image data.

The input image data may be broadcasting image data.

The aforementioned image processing apparatus may further include selection means for selecting, from among a plurality of sets of coefficients associated with a plurality of corresponding up-conversion techniques used in the up-conversion, a set of coefficients based on channel information concerning the channel of the broadcasting image data. The coefficient output means may output a coefficient corresponding to the class of the subject pixel from among the set of coefficients selected by the selection means.

According to another embodiment of the present invention, there is provided an image processing method for processing first image data to output second image data which has higher quality than the first image data. The image processing method includes the steps of down-converting input image data by decreasing the number of pixels of the input image data and converting the first image data into the second image data by using the down-converted image data as the first image data. Converting the first image data into the second image data includes the steps of extracting, as prediction taps, a plurality of pixels used for predicting a subject pixel of the second image data from the first image data, extracting, as class taps, a plurality of pixels used for classifying the subject pixel into one of a plurality of classes from the first image data, classifying the subject pixel based on the class taps, outputting a coefficient corresponding to the class of the subject pixel from among coefficients corresponding to the plurality of classes, the coefficients being determined beforehand by learning, and determining the subject pixel by performing prediction calculations by using the coefficient corresponding to the class of the subject pixel and the prediction taps.

According to another embodiment of the present invention, there is provided a program allowing a computer to execute image processing for processing first image data to output second image data which has higher quality than the first image data. The program includes the steps of down-converting input image data by decreasing the number of pixels of the input image data and converting the first image data into the second image data by using the down-converted image data as the first image data. Converting the first image data into the second image data includes the steps of extracting, as prediction taps, a plurality of pixels used for predicting a subject pixel of the second image data from the first image data, extracting, as class taps, a plurality of pixels used for classifying the subject pixel into one of a plurality of classes from the first image data, classifying the subject pixel based on the class taps, outputting a coefficient corresponding to the class of the subject pixel from among coefficients corresponding to the plurality of classes, the coefficients being determined beforehand by learning, and determining the subject pixel by performing prediction calculations by using the coefficient corresponding to the class of the subject pixel and the prediction taps.

According to another embodiment of the present invention, there is provided an image processing apparatus for processing first image data to output second image data which has higher quality than the first image data. The image processing apparatus includes down-converting means for down-converting input image data by decreasing the number of pixels of the input image data and image conversion means for converting the first image data into the second image data by using the input image data down-converted by the down-converting means as the first image data. The image conversion means includes prediction tap extracting means for extracting, as prediction taps, a plurality of pixels used for predicting a subject pixel of the second image data from the first image data, class tap extracting means for extracting, as class taps, a plurality of pixels used for classifying the subject pixel into one of a plurality of classes from the first image data, classification means for classifying the subject pixel based on the class taps, generating means for generating a coefficient corresponding to each of the plurality of classes from a predetermined parameter and seed data, which serves as a seed for the coefficient and which is determined beforehand by learning, coefficient output means for outputting a coefficient corresponding to the class of the subject pixel from among the coefficients corresponding to the plurality of classes generated by the generating means, and calculation means for determining the subject pixel by performing prediction calculations by using the coefficient corresponding to the class of the subject pixel and the prediction taps.

The aforementioned image processing apparatus may further include determining means for determining the type of input image data. If the determining means determines that the type of input image data is up-converted image data obtained by up-converting another image data by increasing the number of pixels of that image data, the down-converting means may down-convert the input image data by decreasing the number of pixels of the input image data.

The input image data may be broadcasting image data.

The generating means may generate the coefficient corresponding to each of the plurality of classes by using channel information concerning the channel of the broadcasting image data as the predetermined parameter.

According to another embodiment of the present invention, there is provided an image processing method for processing first image data to output second image data which has higher quality than the first image data. The image processing method includes the steps of down-converting input image data by decreasing the number of pixels of the input image data and converting the first image data into the second image data by using the down-converted image data as the first image data. Converting the first image data into the second image data includes the steps of extracting, as prediction taps, a plurality of pixels used for predicting a subject pixel of the second image data from the first image data, extracting, as class taps, a plurality of pixels used for classifying the subject pixel into one of a plurality of classes from the first image data, classifying the subject pixel based on the class taps, generating a coefficient corresponding to each of the plurality of classes from a predetermined parameter and seed data, which serves as a seed for the coefficient and which is determined beforehand by learning, outputting a coefficient corresponding to the class of the subject pixel from among the generated coefficients corresponding to the plurality of classes, and determining the subject pixel by performing prediction calculations by using the coefficient corresponding to the class of the subject pixel and the prediction taps.

According to another embodiment of the present invention, there is provided a program allowing a computer to execute image processing for processing first image data to output second image data which has higher quality than the first image data. The program includes the steps of down-converting input image data by decreasing the number of pixels of the input image data and converting the first image data into the second image data by using the down-converted image data as the first image data. Converting the first image data into the second image data includes the steps of extracting, as prediction taps, a plurality of pixels used for predicting a subject pixel of the second image data from the first image data, extracting, as class taps, a plurality of pixels used for classifying the subject pixel into one of a plurality of classes from the first image data, classifying the subject pixel based on the class taps, generating a coefficient corresponding to each of the plurality of classes from a predetermined parameter and seed data, which serves as a seed for the coefficient and which is determined beforehand by learning, outputting a coefficient corresponding to the class of the subject pixel from among the generated coefficients corresponding to the plurality of classes, and determining the subject pixel by performing prediction calculations by using the coefficient corresponding to the class of the subject pixel and the prediction taps.

According to an embodiment of the present invention, the user can receive high-quality image data.

DESCRIPTION OF THE PREFERRED EMBODIMENTS

Figure 1:
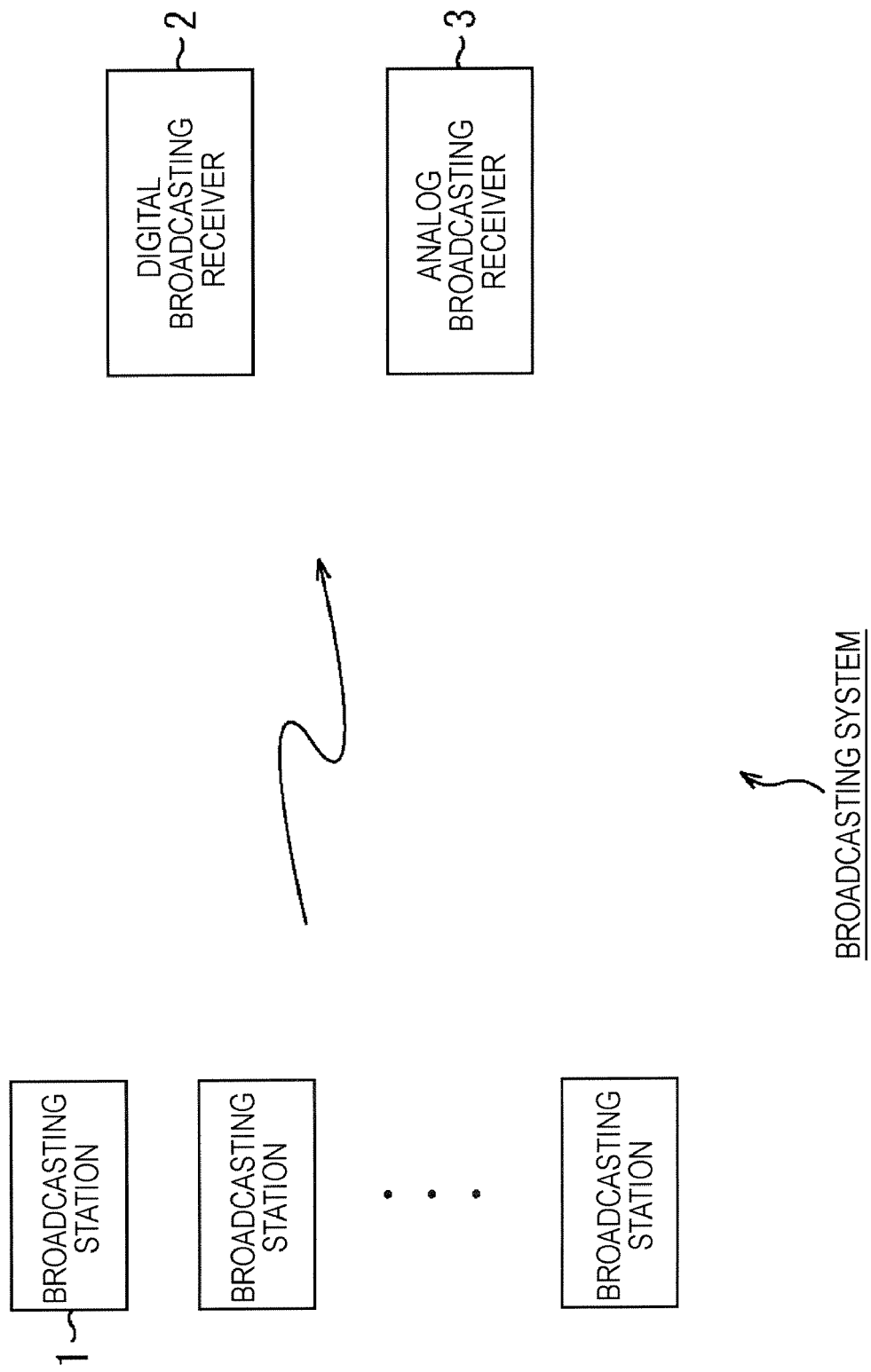
FIG. 1 is a block diagram illustrating the configuration of a broadcasting system according to an embodiment of the present invention.

Before describing an embodiment of the present invention, the correspondence between the features of the claims and an embodiment of the present invention is discussed below. This description is intended to assure that the embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An image processing apparatus (for example, a digital broadcasting receiver 2 shown in FIG. 3) according to an embodiment of the present invention processes first image data to output second image data which has higher quality than the first image data. The image processing apparatus includes down-converting means (for example, a down-converter 45 shown FIG. 3) for down-converting input image data by decreasing the number of pixels of the input image data and image conversion means (for example, an image converter 48 shown in FIG. 3) for converting the first image data into the second image data by using the input image data down-converted by the down-converting means as the first image data. The image conversion means includes prediction tap extracting means (for example, a tap extracting unit 161 shown in FIG. 5) for extracting, as prediction taps, a plurality of pixels used for predicting a subject pixel of the second image data from the first image data, class tap extracting means (for example, a tap extracting unit 162 shown in FIG. 5) for extracting, as class taps, a plurality of pixels used for classifying the subject pixel into one of a plurality of classes from the first image data, classification means (for example, a classification unit 163 shown in FIG. 5) for classifying the subject pixel based on the class taps, coefficient output means (for example, a coefficient memory 164 shown in FIG. 5) for outputting a coefficient corresponding to the class of the subject pixel from among coefficients corresponding to the plurality of classes, the coefficients being determined beforehand by learning, and calculation means (for example, a prediction unit 165 shown in FIG. 5) for determining the subject pixel by performing prediction calculations by using the coefficient corresponding to the class of the subject pixel and the prediction taps.

The image processing apparatus may further include determining means (for example, a determining unit 44 shown in FIG. 3) for determining the type of input image data. If the determining means determines that the type of the input image data is up-converted image data obtained by up-converting another image data by increasing the number of pixels of that image data, the down-converting means down-converts the input image data by decreasing the number of pixels of the input image data.

The image processing apparatus may further include selection means (for example, a coefficient selector 160 shown in FIG. 5) for selecting, from among a plurality of sets of coefficients associated with a plurality of corresponding up-conversion techniques used in the up-conversion, a set of coefficients based on channel information concerning the channel of the broadcasting image data. The coefficient output means outputs a coefficient corresponding to the class of the subject pixel from among the set of coefficients selected by the selection means.

Figure 4:
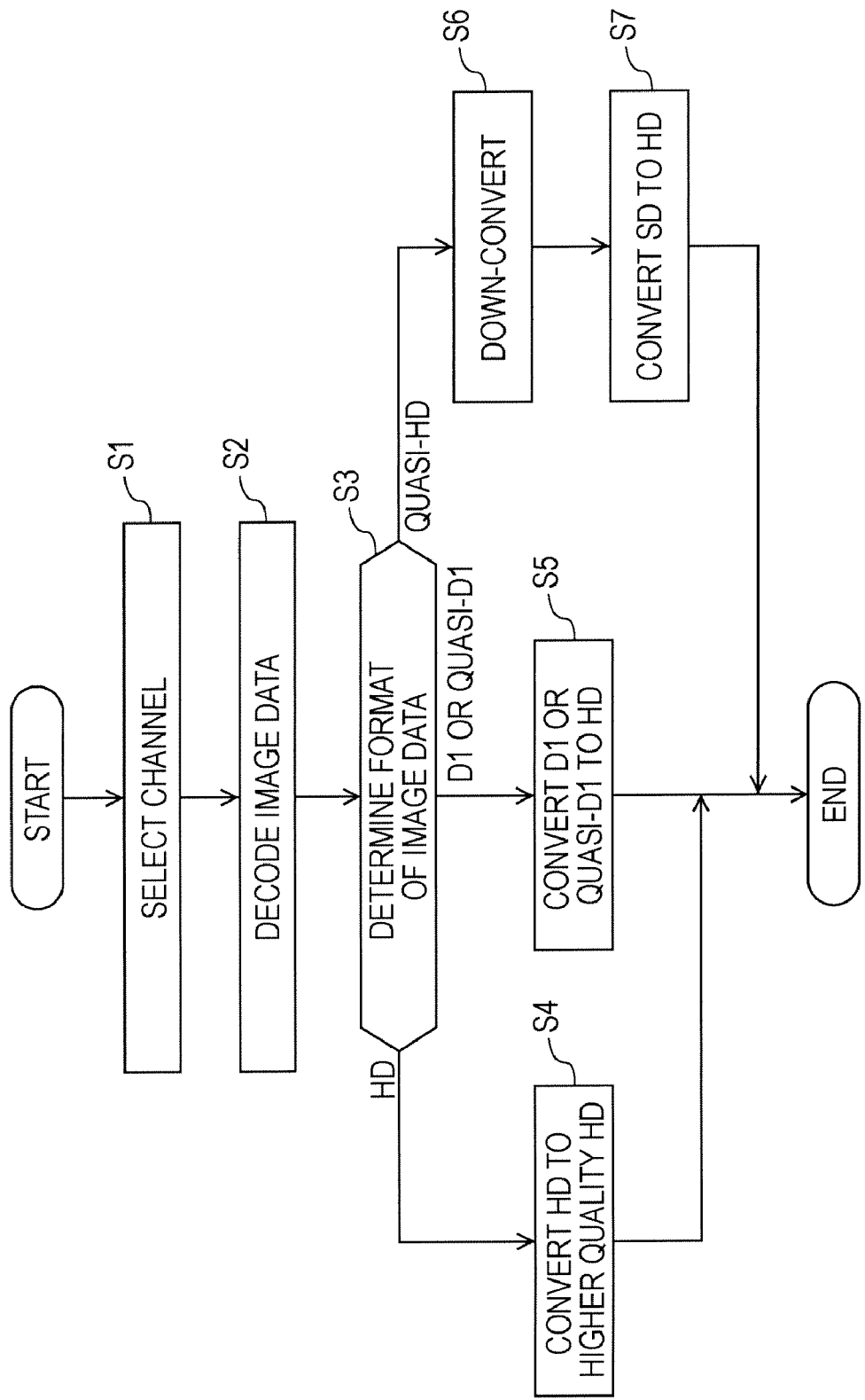
FIG. 4 is a flowchart illustrating the operation performed by the digital broadcasting receiver.

An image processing method or a program for processing first image data to output second image data which has higher quality than the first image data according to an embodiment of the present invention includes the steps of down-converting input image data by decreasing the number of pixels of the input image data (for example, step S6 in FIG. 4) and converting the first image data into the second image data by using the down-converted image data as the first image data (for example, step S7 in FIG. 4). Converting the first image data into the second image data includes the steps of extracting, as prediction taps, a plurality of pixels used for predicting a subject pixel of the second image data from the first image data (for example, step S1111 in FIG. 6), extracting, as class taps, a plurality of pixels used for classifying the subject pixel into one of a plurality of classes from the first image data (for example, step S1111 in FIG. 6), classifying the subject pixel based on the class taps (step S1112 in FIG. 6), outputting a coefficient corresponding to the class of the subject pixel from among coefficients corresponding to the plurality of classes, the coefficients being determined beforehand by learning (for example, step S1113 in FIG. 6), and determining the subject pixel by performing prediction calculations by using the coefficient corresponding to the class of the subject pixel and the prediction taps (for example, step S1114 in FIG. 6).

An image processing apparatus (for example, the digital broadcasting receiver 2 shown in FIG. 3) according to another embodiment of the present invention processes first image data to output second image data which has higher quality than the first image data. The image processing apparatus includes down-converting means (for example, the down-converter 45 shown in FIG. 3) for down-converting input image data by decreasing the number of pixels of the input image data and image conversion means (for example, the image converter 48 shown in FIG. 3) for converting the first image data into the second image data by using the input image data down-converted by the down-converting means as the first image data. The image conversion means includes prediction tap extracting means (for example, a tap extracting unit 161 shown in FIG. 9) for extracting, as prediction taps, a plurality of pixels used for predicting a subject pixel of the second image data from the first image data, class tap extracting means (for example, a tap extracting unit 162 shown in FIG. 9) for extracting, as class taps, a plurality of pixels used for classifying the subject pixel into one of a plurality of classes from the first image data, classification means (for example, a classification unit 163 shown in FIG. 9) for classifying the subject pixel based on the class taps, generating means (for example, a coefficient generator 166 shown in FIG. 9) for generating a coefficient corresponding to each of the plurality of classes from a predetermined parameter and seed data, which serves as a seed for the coefficient and which is determined beforehand by learning, coefficient output means (for example, a coefficient memory 164 shown in FIG. 9) for outputting a coefficient corresponding to the class of the subject pixel from among the coefficients corresponding to the plurality of classes generated by the generating means, and calculation means (for example, a prediction unit 165 shown in FIG. 9) for determining the subject pixel by performing prediction calculations by using the coefficient corresponding to the class of the subject pixel and the prediction taps.

The image processing apparatus may further include determining means (for example, the determining unit 44 shown in FIG. 3) for determining the type of input image data. If the determining means determines that the type of input image data is up-converted image data obtained by up-converting another image data by increasing the number of pixels of that image data, the down-converting means down-converts the input image data by decreasing the number of pixels of the input image data.

An image processing method or a program for processing first image data to output second image data which has higher quality than the first image data according to another embodiment of the present invention includes the steps of down-converting input image data by decreasing the number of pixels of the input image data (for example, step S6 in FIG. 4) and converting the first image data into the second image data by using the down-converted image data as the first image data (for example, step S7 in FIG. 4). Converting the first image data into the second image data includes the steps of extracting, as prediction taps, a plurality of pixels used for predicting a subject pixel of the second image data from the first image data (for example, step S1215 in FIG. 10), extracting, as class taps, a plurality of pixels used for classifying the subject pixel into one of a plurality of classes from the first image data (for example, step S1215 in FIG. 10), classifying the subject pixel based on the class taps (step S1216 in FIG. 10), generating a coefficient corresponding to each of the plurality of classes from a predetermined parameter and seed data, which serves as a seed for the coefficient and which is determined beforehand by learning (for example, step S1213 in FIG. 10), outputting a coefficient corresponding to the class of the subject pixel from among the generated coefficients corresponding to the plurality of classes (for example, step S1217 in FIG. 10), and determining the subject pixel by performing prediction calculations by using the coefficient corresponding to the class of the subject pixel and the prediction taps (for example, step S1218 in FIG. 10).

An embodiment of the present invention is described in detail below with reference to the accompanying drawings.

FIG. 1 is a block diagram illustrating a broadcasting system according to an embodiment of the present invention. Here, the system is a logical set of a plurality of devices, and it is not essential that the devices be in the same housing.

A broadcasting station 1 broadcasts images or sound of a certain program by terrestrial analog broadcasting or terrestrial digital broadcasting. Other broadcasting stations also broadcast images or sound by terrestrial analog broadcasting or terrestrial digital broadcasting. A description is hereinafter given of only images of a program to be broadcast by the broadcasting station 1, and an explanation of associated sound of the same program is omitted.

A digital broadcasting receiver 2 receives images as a program transmitted from the broadcasting station 1 by terrestrial digital broadcasting, and displays the received images on a monitor (not shown). An analog broadcasting receiver 3 receives images as a program transmitted from the broadcasting station 1 by terrestrial analog broadcasting, and displays the received images on a monitor (not shown).

Figure 2:
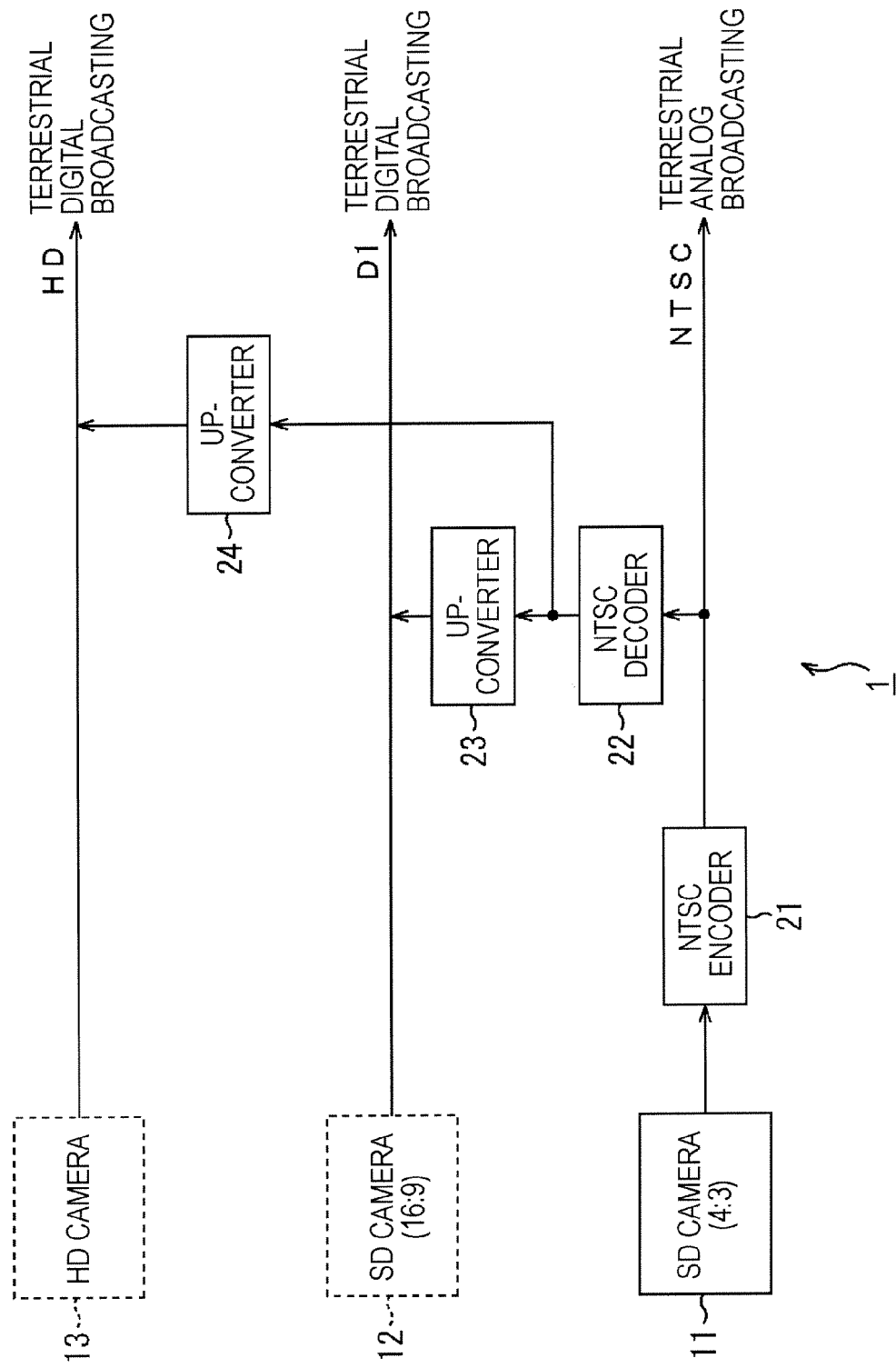
FIG. 2 illustrates the main portion of a broadcasting station.

FIG. 2 is a block diagram illustrating the main portion of the broadcasting station 1 shown in FIG. 1.

The broadcasting station 1 includes an SD camera 11 for capturing SD images having an aspect ratio of 4:3. In the broadcasting station 1, an SD image associated with a component signal captured by the SD camera 11 is converted (encoded) into an NTSC composite signal by an NTSC encoder 21, and the converted NTSC composite signal is then broadcast by terrestrial analog broadcasting.

If the broadcasting station 1 includes an SD camera 12 for capturing D1 images or an HD camera 13 for capturing HD images, as indicated by the broken lines in FIG. 2, component-signal D1 images captured by the SD camera 12 or component-signal HD images captured by the HD camera 13 are broadcast in a channel as a frequency band assigned to the broadcasting station 1 by terrestrial digital broadcasting.

If the broadcasting station 1 does not include the SD camera 12, an NTSC decoder 22 converts (decodes) an NTSC composite signal output from the NTSC encoder 21 into a component signal, and supplies it to an up-converter 23. The up-converter 23 then up-converts the component signal so that the format of the component-signal image becomes the same as that of a D1 image output from the SD camera 12, and the resulting quasi-D1 image is broadcast by terrestrial digital broadcasting.

If the broadcasting station 1 does not include the HD camera 13, the NTSC decoder 22 converts (decodes) an NTSC composite signal output from the NTSC encoder 21 into a component signal, and supplies it to an up-converter 24. The up-converter 24 then up-converts the component signal so that the format of the component-signal image becomes the same as that of an HD image output from the HD camera 13, and the resulting quasi-HD image is broadcast by terrestrial digital broadcasting.

Figure 3:
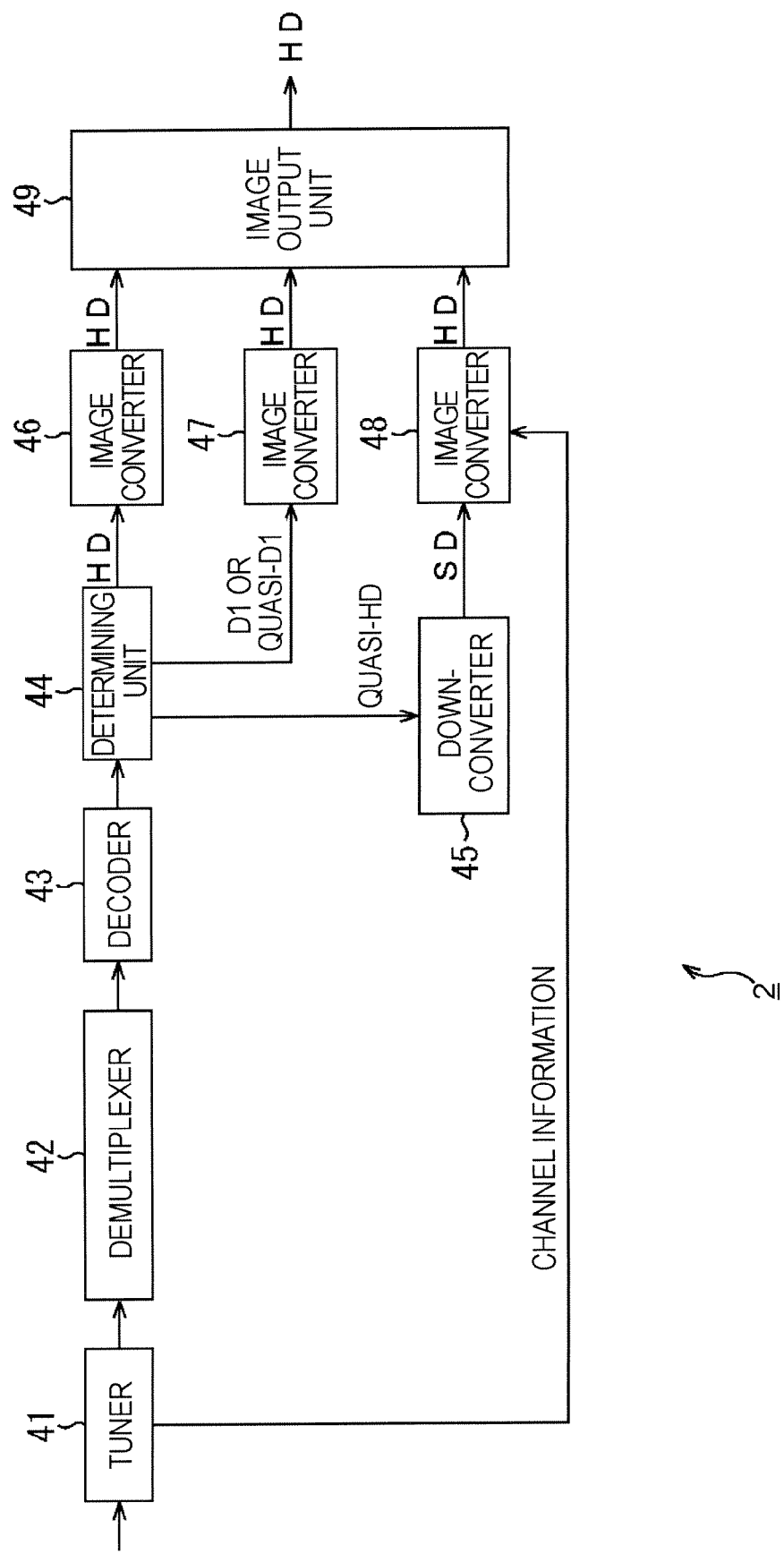
FIG. 3 is a block diagram illustrating the configuration of a digital broadcasting receiver.

FIG. 3 is a block diagram illustrating the configuration of the digital broadcasting receiver 2 shown in FIG. 1.

A tuner 41 receives a terrestrial digital broadcasting signal and extracts a signal component corresponding to a channel selected by the user through a remote commander (not shown), and then supplies the extracted signal component to a demultiplexer 42. The demultiplexer 42 separates necessary packets from the signal component output from the tuner 41, and supplies the packets to a decoder 43. The decoder 43 then decodes MPEG-encoded image data contained in the packets according to an MPEG method, and supplies the resulting image data to a determining unit 44.

Though it is not described with reference to FIG. 2, the broadcasting station 1 MPEG-encodes image data and broadcasts the encoded image data by terrestrial digital broadcasting.

The determining unit 44 determines the type of image data supplied from the decoder 43 and supplies the image data to a down-converter 45, an image converter 46, or an image converter 47 based on the determination result.

More specifically, if the type of image data supplied from the decoder 43 is found to be quasi-HD image data, which is one type of up-converted image data, obtained by converting an NTSC composite signal into a component signal and by up-converting the component signal by increasing the number of pixels, the determining unit 44 supplies the image data, which is quasi-HD image data, to the down-converter 45.

If the type of image data from the decoder 43 is found to be quasi-D1 image data, which is another type of up-converted image data, obtained by converting an NTSC composite signal into a component signal and by up-converting the component signal by increasing the number of pixels, or if the type of image data is found to be D1 image data, the determining unit 44 supplies the image data, which is quasi-D1 image data or D1 image data, to the image converter 47.

If the type of image data from the decoder 43 is found to be HD image data, the determining unit 44 supplies the image data, which is HD image data, to the image converter 46.

A determination as to whether the image data supplied from the decoder 43 is HD image data or quasi-HD image data or whether the image data is D1 image data or quasi-D1 image data can be made based on the format of the image data, that is, the number of pixels of one frame forming the image data.

A determination as to whether the image data supplied from the decoder 43 is HD image data or quasi-HD image data may be made based on the activity of the image data. More specifically, the resolution of HD image data is high, while the resolution of quasi-HD image data is not so high since it is merely image data obtained by converting an NTSC composite signal into a component signal. Accordingly, if the image data from the decoder 43 exhibits the activity having a certain threshold, the image data can be found to be HD image data. Conversely, if the image data from the decoder 43 exhibits the activity less than a certain threshold, the image data can be found to be quasi-HD image data.

Both the HD image data and quasi-HD image data have an aspect ratio of 16:9. In reality, however, quasi-HD image data is image data obtained by converting an NTSC composite signal image having an aspect ratio of 4:3 into a component signal image and by up-converting the component signal so that the aspect ratio can be 16:9. Accordingly, in the resulting quasi-HD image data, black colors are added to the left and right edges of the 4:3 image data. Thus, a determination as to whether the image data from the decoder 43 is HD image data or quasi-HD image data may be made by determining whether black colors can be observed at the left and right edges of the image data.

In the example shown in FIG. 3, since the image data supplied from the decoder 43 is supplied to the image converter 47 regardless of whether the image data is quasi-D1 image data or D1 image data, a determination as to whether the image data is quasi-D1 image data or D1 image data is not necessary. If, however, this determination is made at all, it can be made similarly when determining whether the image data is HD image data or quasi-HD image data.

The down-converter 45 reduces the number of pixels of the quasi-HD image data supplied from the determining unit 44 to the number of pixels of the component signal image output from the NTSC decoder 22 shown in FIG. 2, and if necessary, the down-converter 45 further down-converts the quasi-HD image data by filtering it by using a low-pass filter (LPS), and then supplies the resulting SD image data to an image converter 48.

The image converter 46 converts the HD image data supplied from the determining unit 44 into higher quality HD image data, and then supplies the resulting HD image data to an image output unit 49.

The image converter 47 converts the quasi-D1 image data or the D1 image data supplied from the determining unit 44 into higher quality HD image data, and then supplies the resulting HD image data to the image output unit 49.

The image converter 48 converts the SD image data supplied from the down-converter 45 into higher quality HD image data, and then supplies the resulting HD image data to the image output unit 49.

The image output unit 49 supplies the HD image data output from one of the image converters 46 through 48 to a monitor (not shown), and displays the HD image data on the monitor.

The operation performed by the digital broadcasting receiver 2 shown in FIG. 3 is described below with reference to the flowchart in FIG. 4.

In the digital broadcasting receiver 2, in step S1, the tuner 41 receives a terrestrial digital broadcasting signal and extracts (selects) a signal component corresponding to a channel selected by the user through a remote commander, and supplies the extracted signal component to the demultiplexer 42. The demultiplexer 42 then separates necessary packets from the signal component supplied from the tuner 41, and supplies the packets to the decoder 43. Then, in step S2, the decoder 43 decodes MPEG-encoded image data contained in the packets according to an MPEG method, and supplies the resulting image data to the determining unit 44.

In step S3, the determining unit 44 determines the type (format) of image data supplied from the decoder 43, and supplies the image data to the down-converter 45, the image converter 46, or the image converter 47 based on the determination result.

If the image data is found to be HD image data in step S3, the determining unit 44 supplies the image data, which is HD image data, to the image converter 46.

Then, in step S4, the image converter 46 sets the HD image data supplied from the determining unit 44 to be first image data, and also sets HD image data, which has a higher quality than the first image data, to be second image data. The image converter 46 then converts the first image data to the second image data, and supplies the second image data to the image output unit 49. The image output unit 49 then supplies the HD image data to a monitor.

If the image data from the decoder 43 is found to be D1 image data or quasi-D1 image data in step S3, the determining unit 44 supplies the image data to the image converter 47.

Then, in step S5, the image converter 47 sets the D1 image data or the quasi-D1 image data supplied from the determining unit 44 to be first image data, and also sets HD image data, which has a higher quality than the first image data, to be second image data. The image converter 47 then converts the first image data into the second image data, and supplies the resulting high-quality HD image data to the image output unit 49. The image output unit 49 then supplies the HD image data to the monitor.

If the image data from the decoder 43 is found to be quasi-HD image data in step S3, the determining unit 44 supplies the quasi-HD image data to the down-converter 45.

Then, in step S6, the down-converter 45 down-converts the quasi-HD image data so that the number of pixels of the quasi-HD image data is reduced to the number of pixels of a component signal image output from the NTSC decoder 22 shown in FIG. 2, and supplies the resulting SD image data to the image converter 48.

Then, in step S7, the image converter 48 sets the SD image data supplied from the down-converter 45 to be first image data, and also sets HD image data, which has a higher quality than the first image data, to be second image data. The image converter 48 then converts the first image data to the second image data and supplies the resulting high-quality HD image data to the image output unit 49. The image output unit 49 then supplies the HD image data to the monitor.

The image converter 48 receives channel information concerning the channel currently received from the tuner 41, i.e., channel information concerning the channel in which quasi-HD image data up-converted from the SD image data supplied to the image converter 48 from the down-converter 45 is broadcast. The image converter 48 converts the SD image data to HD image data based on the channel information concerning the channel in which the quasi-HD image data up-converted from the SD image data is broadcast.

The image conversion processing performed by the image converter 48 shown in FIG. 3 is as follows.

The image converter 48 performs image conversion so that first image data is converted into second image data, which has a higher quality than the first image data.

As discussed above, the image converter 48 sets the SD image data supplied from the down-converter 45 to be first image data and also sets HD image data, which has a higher quality than the first image data, to be second image data, and then performs image conversion processing so that the first image data can be converted into the second image data. According to this image conversion processing, various processing operations can be implemented depending on how the first and second image data are defined.

More specifically, if the second image data is set to be high-resolution image data, and also, if the first image data is set to be low-resolution image data obtained by reducing the resolution of the second image data, the image conversion processing can be resolution enhancing processing. If the second image data is set to be high signal-to-noise (S/N) image data and if the first image data is low S/N image data obtained by reducing the S/N ratio of the second image data, the image conversion processing can be noise reduction processing. If the second image data is set to be HD image data and if the first image data is SD image data obtained by reducing the number of pixels and the resolution of the second image data, the image conversion processing can be processing for converting from an SD image to an HD image.

Figure 5:
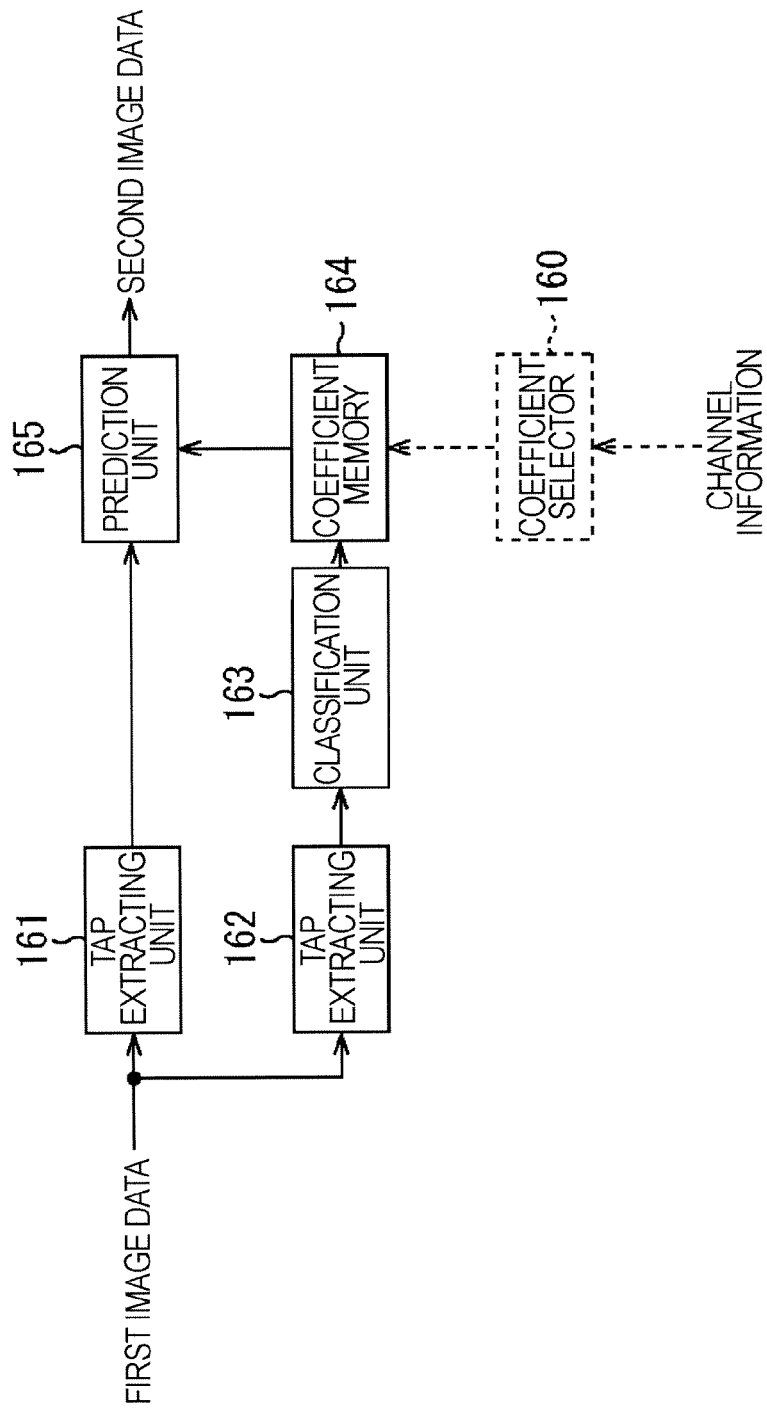
FIG. 5 is a block diagram illustrating an example of the configuration of an image converter.

FIG. 5 is a block diagram illustrating an example of the functional configuration of the image converter 48 that performs the above-described image conversion processing.

The image converter 48 includes a coefficient selector 160, tap extracting units 161 and 162, a classification unit 163, a coefficient memory 164, and a prediction unit 165.

The image converter 48 receives SD image data output from the down-converter 45 shown in FIG. 3 as first image data. The image converter 48 also receives, from the tuner 41 (FIG. 3), channel information concerning the channel of SD image data output from the down-converter 45, i.e., channel information concerning the channel that is broadcasting quasi-HD image data, which is before being down-converted to the SD image data.

The SD image data, which is the first image data, is supplied to the tap extracting units 161 and 162, while the channel information concerning the channel of the SD image data is supplied to the coefficient selector 160.

The coefficient selector 160 selects, based on the channel information concerning the SD image data, one set of tap coefficients from a plurality of sets of tap coefficients stored in the coefficient memory 164, which is described later, and makes the selected set of tap coefficients effective by, for example, so-called "memory bank switching". That is, the coefficient memory 164 reads and outputs the tap coefficient corresponding to information supplied from the classification unit 163 among the plurality of sets of tap coefficients, and the coefficient selector 160 selects the set of tap coefficients including the tap coefficient read by the coefficient memory 164. The set of tap coefficients read by the coefficient memory 164 are referred to as an "effective set of tap coefficients".

The tap extracting unit 161 sequentially sets, as a subject pixel, pixels one by one forming HD image data, which serves as second image data to be converted from the first image data, and also extracts several pixels forming the first image data as prediction taps used for predicting the pixel value of the subject pixel. In this case, since the HD image data as the second image data has not been determined yet, it is only assumed in a virtual manner.

More specifically, the tap extracting unit 161 extracts a plurality of pixels located spatially or temporally close to the subject pixel (for example, the pixel positioned most adjacent to the subject pixel and pixels spatially around the most adjacent pixel).

The tap extracting unit 162 extracts several pixels forming the first image data as class taps used for classifying the subject pixel, in other words, class taps used for grouping the subject pixel into one of the classes.

For the convenience of simple description, it is now assumed that the prediction taps and the class taps have the same tap structure, i.e., they are formed of the same pixel. However, the prediction taps and the class taps may have different tap structures.

The prediction taps extracted by the tap extracting unit 161 are supplied to the prediction unit 165, while the class taps extracted by the tap extracting unit 162 are supplied to the classification unit 163.

The classification unit 163 classifies the subject pixel based on the class taps supplied from the tap extracting unit 162, and supplies the class code corresponding to the determined class to the coefficient memory 164.

As the classification method, for example, adaptive dynamic range coding (ADRC) may be employed.

In this method, the pixel values of the pixels forming the class taps are subjected to ADRC processing, and the class of the subject pixel is determined in accordance with the resulting ADRC code.

In K-bit ADRC, the maximum value MAX and the minimum value MIN of the pixel values of the pixels forming the class taps are detected, and then, DR=MAX−MIN is set to be the local dynamic range of a set of pixels forming the class taps. Based on the dynamic range DR, the pixel values of the pixels forming the class taps are re-quantized into K bits. More specifically, the minimum value MIN is subtracted from the pixel value of each pixel forming the class taps, and the resulting value is divided (quantized) by $DR/2^K$. Then, the bit string of the K-bit pixel values forming the class taps arranged in a predetermined order is output as the ADRC code. If the class taps are subjected to 1-bit ADRC processing, the minimum value MIN is subtracted from the pixel value of each pixel forming the class taps, and then, the resulting value is divided (truncating decimal places) by ½ of the difference between the maximum value MAX and the minimum value MIN, so that the pixel value of each pixel can be binarized (one bit). Then, the bit string of the 1-bit pixel values arranged in a predetermined order is output as the ADRC code.

The classification unit 163 may output the level distribution pattern of the pixel values of the pixels forming the class taps as the class code. In this case, however, if the class taps are formed of N pixels, and if K bits are assigned to the pixel value of each pixel, the number of class codes output from the classification unit 163 becomes enormous as $(2^N)^K$, which is exponentially proportional to the number K of bits assigned to the pixel value of each pixel.

Accordingly, it is preferable that the classification unit 163 classifies the subject pixel after compressing the amount of information of the class taps by the above-described ADRC processing or vector quantization.

The coefficient memory 164 stores a set of tap coefficients for each class that have been determined by learning, which is described below, and outputs, among the stored sets of tap coefficients, the tap coefficient stored at the address corresponding to the class code supplied from the classification unit 163, i.e., the tap coefficient corresponding to the class represented by the class code supplied from the classification unit 163.

The quasi-HD image data is image data before being converted to SD image data, which serves as the first image data to be subjected to image conversion processing in the image converter 48, (such quasi-HD image data is sometimes referred to as "quasi-HD image data corresponding to SD image data"). As discussed with reference to FIG. 2, the quasi-HD image data has been obtained by converting composite signal image data into component signal image data in the broadcasting station 1 and by up-converting the component signal image data.

In this case, various up-conversion techniques may be employed. For example, the pixels having the same pixel values as those of the image data to be up-converted may be interpolated into the component signal image data. Alternatively, the pixels having the weighted average value of the pixel values of a plurality of pixels of the image data to be up-converted may be interpolated into the component signal image data.

It is possible that the up-conversion technique employed varies depending on the broadcasting station.

Accordingly, in the image converter 48, the coefficient memory 164 stores a plurality of sets of tap coefficients associated with various up-conversion techniques so that, regardless of which up-conversion technique for obtaining the quasi-HD image data is employed, the SD image data down-converted from the quasi-HD image data can be suitably converted into HD image data.

As stated above, the up-conversion technique varies depending on the broadcasting station, i.e., depending on the channel. Accordingly, the coefficient selector 160 selects, among a plurality of sets of tap coefficients stored in the coefficient memory 164, one set of tap coefficients based on the channel information concerning the channel of the SD image data, which serves as the first image data. That is, the coefficient selector 160 selects the set of tap coefficients suitable for image conversion processing to be performed on the SD image data which has been down-converted from the quasi-HD image data obtained by the up-conversion technique employed in the broadcasting station associated with the channel represented by the channel information, and makes the selected set of tap coefficients effective.

Then, the coefficient memory 164 outputs, from the effective set of tap coefficients, the tap coefficient stored at the address corresponding to the class code supplied from the classification unit 163, i.e., the tap coefficient corresponding to the class of the subject pixel.

Accordingly, the tap coefficient output from the coefficient memory 164 is the tap coefficient suitable for image conversion processing to be performed on the SD image data which has been down-converted from the quasi-HD image data obtained by the up-conversion technique employed in the broadcasting station corresponding to the channel represented by the channel information.

The tap coefficient is the coefficient to be multiplied with input data at so-called "taps" in a digital filter.

The prediction unit 165 receives the prediction taps from the tap extracting unit 161 and the tap coefficient from the coefficient memory 164, and performs predetermined prediction calculations for determining the prediction value of the true value of the subject pixel by using the prediction taps and the tap coefficient. Thus, the prediction unit 165 determines the pixel value (prediction value) of the subject pixel, i.e., the pixel value of the pixel forming the second image data.

Figure 6:
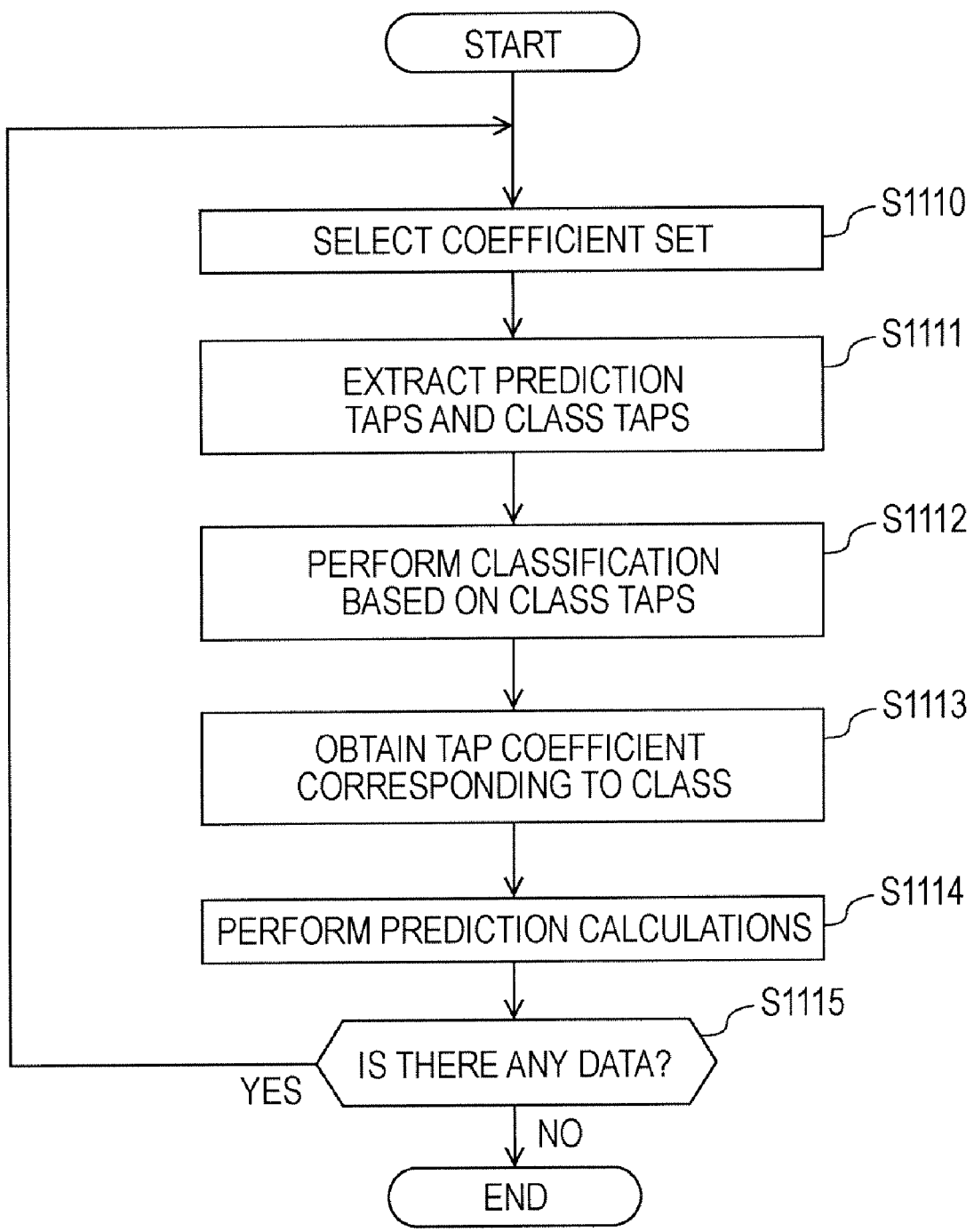
FIG. 6 is a flowchart illustrating the processing performed by the image converter.

The image conversion processing performed by the image converter 48 shown in FIG. 5 is described below with reference to the flowchart in FIG. 6.

In step S1110, based on channel information received from the tuner 41 (FIG. 3), the coefficient selector 160 selects, among a plurality of sets of tap coefficients stored in the coefficient memory 164, a set of tap coefficients suitable for image conversion processing to be performed on SD image data which has been down-converted from quasi-HD image data obtained by the up-conversion technique employed in the broadcasting station corresponding to the channel represented by the channel information, and makes the selected set of tap coefficients effective.

Meanwhile, the tap extracting unit 161 sequentially selects, as a subject pixel, pixels forming HD image data, which serves as second image data, corresponding to the SD image data, which serves as first image data, supplied from the down-converter 45 (FIG. 3). Then, in step S1111, the tap extracting units 161 and 162 extract prediction taps and class taps, respectively, for the subject pixel selected by the tap extracting unit 161. The tap extracting unit 161 supplies the prediction taps to the prediction unit 165, while the tap extracting unit 162 supplies the class taps to the classification unit 163.

In step S1112, upon receiving the class taps concerning the subject pixel from the tap extracting unit 162, the classification unit 163 classifies the subject pixel based on the received class taps. The classification unit 163 also outputs the class code representing the determined class of the subject pixel to the coefficient memory 164.

Then, in step S1113, the coefficient memory 164 reads, from the effective set of tap coefficients selected by the coefficient selector 160, the tap coefficient corresponding to the class code supplied from the classification unit 163, i.e., the tap coefficient corresponding to the class of the subject pixel. The coefficient memory 164 also outputs the tap coefficient to the prediction unit 165.

Then, in step S1114, the prediction unit 165 performs predetermined prediction calculations for determining the pixel value of the subject pixel by using the prediction taps output from the tap extracting unit 161 and the tap coefficient output from the coefficient memory 164, and supplies the determined pixel value of the subject pixel to the image output unit 49 (FIG. 3).

The tap extracting unit 161 then determines in step S1115 whether there is any unselected pixel of the second image data. If an unselected pixel is found in step S1115, the tap extracting unit 161 sets the unselected pixel as the subject pixel and returns to step S1110. Step 1110 and the subsequent steps are then repeated.

If it is determined in step S1115 that there is no unselected pixel of the second image data, the processing is completed.

Details of the prediction calculations performed by the prediction unit 165 and learning of tap coefficients stored in the coefficient memory 164 are described.

It is now assumed that, as the image conversion processing, high-quality image data is set to be second image data and low-quality image data obtained by reducing the image quality (resolution) of the high-quality image data by filtering it by using a low-pass filter (LPF) is set to be first image data, and then, prediction taps are extracted from the low-quality image data, and the pixel values of the high quality image pixels are determined by using the prediction taps and tap coefficients according to predetermined prediction calculations.

As the predetermined prediction calculations, linear prediction calculations may be conducted. Accordingly, the pixel value y of a high quality pixel can be determined by the following linear equation:

$$y = \sum_{n=1}^{N} w_n x_n \quad (1)$$

wherein $x_n$ represents the n-th pixel of the low-quality image data (hereinafter referred to as the "low quality pixel") forming prediction taps for the corresponding high quality pixel, and $w_n$ designates the n-th tap coefficient multiplied with the n-th low quality pixel. In equation (1), the prediction taps are formed of N low quality pixels $x_1, x_2, \ldots,$ and $x_N$.

The pixel value y of the high quality pixel may be determined by a higher order equation rather than the linear equation expressed by equation (1).

When the true value of the pixel value of the k-th sample high quality pixel is indicated by $y_k$ and when the prediction value of the true value $y_k$ obtained by equation (1) is indicated by $y_k'$, the prediction error $e_k$ can be determined by equation (2).

$$e_k = y_k - y_k' \quad (2)$$

Since the prediction value $y_k'$ in equation (2) is determined by equation (1), equation (3) can be found by substituting $y_k'$ in equation (2) into equation (1):

$$e_k = y_k - \left( \sum_{n=1}^{N} \left( \sum_{m=1}^{M} \beta_{m,n} t_m \right) x_{n,k} \right) \quad (3)$$

where $x_{n,k}$ indicates the n-th low quality pixel forming the prediction taps for the k-th sample high quality pixel.

The tap coefficient $w_n$ that sets the prediction error $e_k$ in equation (3) or (2) to be 0 is the optimal tap coefficient for predicting the corresponding high quality pixel. Generally, however, it is difficult to determine such tap coefficients $w_n$ for all high quality pixels.

Thus, if, for example, the least square method is used as the standard for indicating that the tap coefficient $w_n$ is optimal, the optimal tap coefficient $w_n$ can be determined by minimizing the sum E of the square errors expressed by equation (4):

$$E = \sum_{k=1}^{K} e_k^2 \quad (4)$$

where K indicates the number of sample sets (number of learning samples) of the high quality pixel $y_k$ and low quality pixels $x_{1,k}, x_{2,k}, \ldots,$ and $x_{N,k}$ forming the prediction taps for the high quality pixel $y_k$.

The minimum value of the sum E of the square errors in equation (4) can be determined by the tap coefficient $w_n$ that sets the result obtained by partially differentiating the sum E with the tap coefficient $w_n$ to be 0, as expressed by equation (5).

$$\frac{\partial E}{\partial w_n} = e_1 \frac{\partial e_1}{\partial w_n} + e_2 \frac{\partial e_2}{\partial w_n} + \cdots + e_k \frac{\partial e_k}{\partial w_n} = 0 \ (n = 1, 2, \cdots, N) \quad (5)$$

By partially differentiating equation (3) with the tap coefficient $w_n$, equation (6) can be obtained.

$$\frac{\partial e_k}{\partial w_1} = -x_{1,k}, \ \frac{\partial e_k}{\partial w_2} = -x_{2,k}, \cdots, \frac{\partial e_k}{\partial w_N} = -x_{N,k}, \quad (6)$$

$$(k = 1, 2, \cdots, K)$$

Equation (7) can be found from equation (5) and equation (6).

$$\sum_{k=1}^{K} e_k x_{1,k} = 0, \ \sum_{k=1}^{K} e_k x_{2,k} = 0, \cdots \sum_{k=1}^{K} e_k x_{N,k} = 0 \quad (7)$$

By substituting equation (3) into $e_k$ in equation (7), equation (7) can be expressed by normal equations represented by equation (8).

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (8)$$

The normal equations in equation (8) can be solved with respect to the tap coefficient $w_n$ by using, for example, a sweeping out method (Gauss-Jordan elimination).

By solving the normal equations in equation (8) for each class, the optimal tap coefficient (that minimizes the sum E of square errors) $w_n$ can be determined for each class.

The image converter 48 shown in FIG. 5 performs calculations according to equation (1) by using the tap coefficient for each class so that SD image data, which serves as the first image data, can be converted into HD image data, which serves as the second image data.

Figure 7:
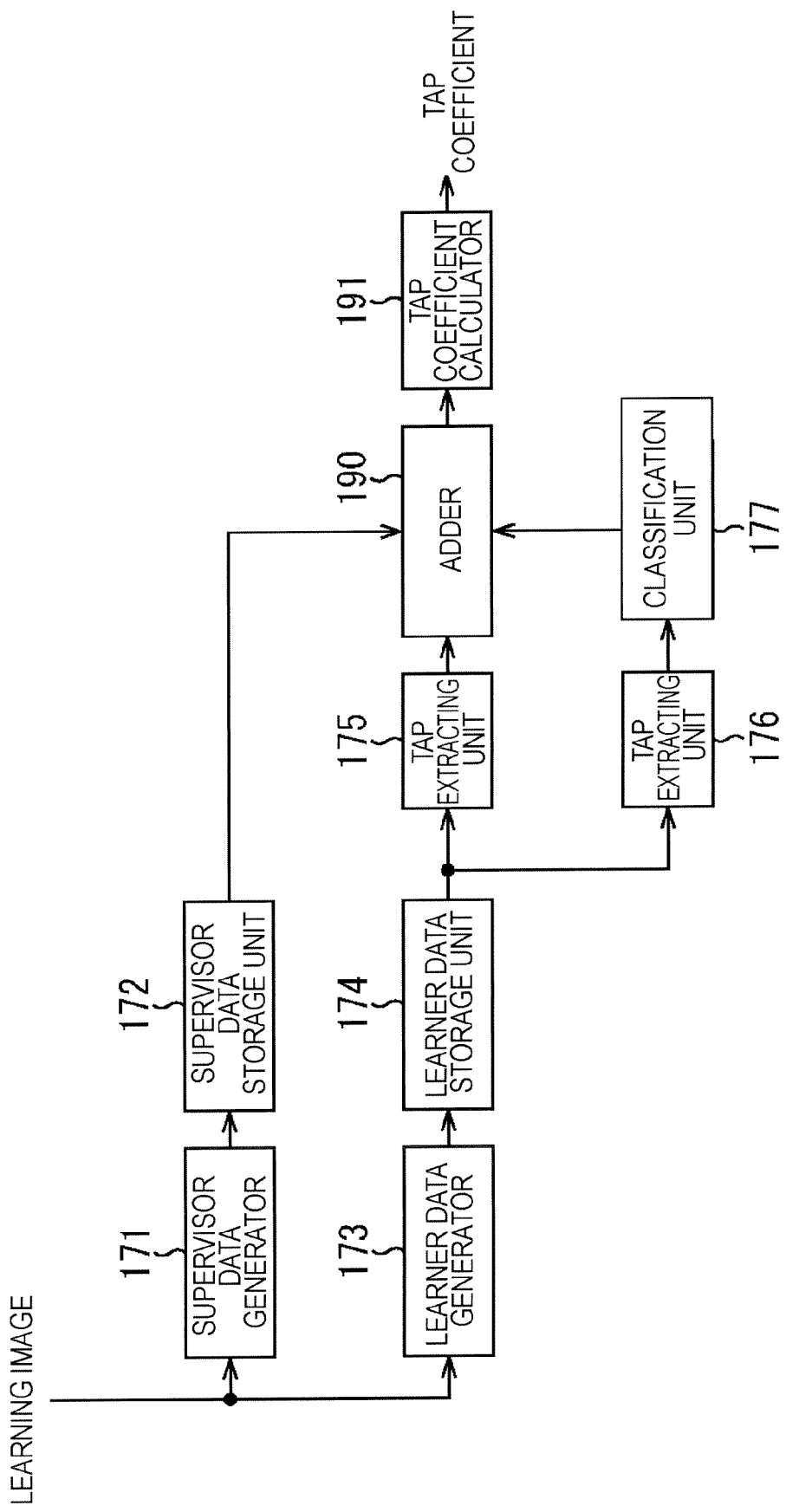
FIG. 7 is a block diagram illustrating an example of the configuration of a learning device for learning tap coefficients.

FIG. 7 is a block diagram illustrating an example of the configuration of a learning device that conducts learning for determining the tap coefficient $w_n$ by solving the normal equations in equation (8) for each class.

Learning image data used for learning of the tap coefficient $w_n$ is input into the learning device. As the learning image data, for example, HD image data obtained by the HD camera 13 (FIG. 2) or higher quality HD image data may be used.

In the learning device, the learning image data is supplied to a supervisor data generator 171 and a learner data generator 173.

The supervisor data generator 171 generates supervisor data, which corresponds to the second image data, from the learning image data, and supplies the supervisor data to a supervisor data storage unit 172. That is, the supervisor data generator 171 directly supplies the HD image data, which is the learning image data, to the supervisor data storage unit 172 as the supervisor data.

The supervisor data storage unit 172 stores the HD image data supplied from the supervisor data generator 171 as the supervisor data.

The learner data generator 173 generates learner data, which corresponds to the first image data, from the learning image data, and supplies the learner data to a learner data storage unit 174.

More specifically, the learner data generator 173 generates supervisor data (HD image data) from the learning image data in a manner similar to the supervisor data generator 171, and then, down-converts the HD image data to generate component-signal SD image data of image quality equivalent to SD image data output from the SD camera 11 (FIG. 2). The learner data generator 173 then converts the component-signal SD image data into composite-signal SD image data in a manner similar to the broadcasting station 1 (FIG. 2), and up-converts the composite-signal SD image data by reconverting it into component-signal SD image data, thereby generating quasi-HD image data. Thereafter, the learner data generator 173 down-converts the quasi-HD image data in a manner similar to the down-converter 45 (FIG. 3), and supplies the resulting SD image data to the learner data storage unit 174 as learner data.

The learner data storage unit 174 stores the learner data supplied from the learner data generator 173.

A tap extracting unit 175 sequentially sets, as a subject pixel, pixels one by one forming the HD image data, which serves as the supervisor data, stored in the supervisor data storage unit 172. The tap extracting unit 175 then extracts predetermined pixels forming the SD image data as the learner data stored in the learner data storage unit 174 for the subject pixel, thereby determining prediction taps having the same tap structure as the prediction taps obtained by the tap extracting unit 161 shown in FIG. 5 (prediction taps formed of the pixels of the learner data located in the same positional relationship with respect to the subject pixel as that of the pixels forming the prediction taps obtained by the tap extracting unit 161 shown in FIG. 5). The tap extracting unit 175 then supplies the determined prediction taps to an adder 190.

A tap extracting unit 176 extracts predetermined pixels forming the SD image data, which is the learner data, stored in the learner data storage unit 174 for the subject pixel to determine class taps having the same tap structure as the class taps obtained by the tap extracting unit 162 shown in FIG. 5. The tap extracting unit 176 then supplies the determined class taps to a classification unit 177.

The classification unit 177 performs classification in a manner similar to the classification unit 163 shown in FIG. 5 based on the class taps output from the tap extracting unit 176, and outputs the class code corresponding to the determined class to the adder 190.

The adder 190 reads the subject pixel from the supervisor data storage unit 172, and performs summation, for each class code supplied from the classification unit 177, for the subject pixel and the pixels of the learner data forming the prediction taps supplied from the tap extracting unit 175.

That is, the adder 190 receives the pixel value $y_k$ of the subject pixel of the supervisor data stored in the supervisor data storage unit 172, the pixel values $x_{n,k}$ of the pixels of the learner data forming the prediction taps output from the tap extracting unit 175, and the class code representing the class of the subject pixel output from the classification unit 177.

The adder 190 then performs calculations, such as multiplications ($x_{n,k}x_{n',k}$) of learner data and summations ($\Sigma$) in the matrix of the left side in equation (8) by using the prediction taps (learner data) $x_{n,k}$ for each class corresponding to the class code supplied from the classification unit 177.

The adder 190 also performs calculations, such as multiplications ($x_{n,k}y_k$) of learner data $x_{n,k}$ and supervisor data $y_k$ and summations ($\Sigma$) in the vector of the right side in equation (8) by using the prediction taps (learner data) $x_{n,k}$ and the supervisor data $y_k$ for each class corresponding to the class code supplied from the classification unit 177.

That is, the adder 190 stores in a built-in memory (not shown) the component ($\Sigma x_{n,k}x_{n',k}$) in the matrix of the left side and the component ($\Sigma x_{n,k}y_k$) in the vector of the right side in equation (8), which are determined for the previous subject pixel of the supervisor data, and then adds (addition represented by the summations in equation (8)) the corresponding component $x_{n,k+1}x_{n',k+1}$ or $x_{n,k+1}y_{k+1}$ calculated by using the supervisor data $y_{k+1}$ and the learner data $x_{n,k+1}$ for the current subject pixel of the supervisor data to the component ($\Sigma x_{n,k}x_{n',k}$) or the component ($\Sigma x_{n,k}y_k$), respectively.

The adder 190 performs the above-described addition on all the pixels of the supervisor data stored in the supervisor data storage unit 172 to establish the normal equations expressed by equation (8) for each class, and then supplies the normal equations to a tap coefficient calculator 191.

The tap coefficient calculator 191 solves the normal equations for each class supplied from the adder 190 to determine the optimal tap coefficient $w_n$.

The learning processing performed by the learning device shown in FIG. 7 is described below with reference to the flowchart in FIG. 8.

In step S1121, the supervisor data generator 171 and the learner data generator 173 generate supervisor data and learner data, respectively, from learning image data.

More specifically, the supervisor data generator 171 generates image data of quality equivalent to, for example, HD image data obtained by the HD camera 13 (FIG. 2), and outputs the generated image data as supervisor data. The learner data generator 173 generates supervisor data (HD image data) from the learning image data in a manner similar to the supervisor data generator 171, and then, down-converts the HD image data to generate component-signal SD image data of quality equivalent to SD image data output from the SD camera 11 (FIG. 2). The learner data generator 173 then converts the component-signal SD image data into composite-signal SD image data in a manner similar to the broadcasting station 1 (FIG. 2), and up-converts the composite-signal SD image data by reconverting it into component-signal SD image data, thereby generating quasi-HD image data. Thereafter, the learner data generator 173 down-converts the quasi- HD image data in a manner similar to the down-converter 45 (FIG. 3), and supplies the resulting SD image data to the learner data storage unit 174 as learner data.

The supervisor data output from the supervisor data generator 171 is supplied to the supervisor data storage unit 172 and is stored therein. The learner data output from the learner data generator 173 is supplied to the learner data storage unit 174 and is stored therein.

Then, in step S1122, the tap extracting unit 175 selects a pixel, which has not been selected, of the supervisor data stored in the supervisor data storage unit 172. The tap extracting unit 175 also determines prediction taps for the subject pixel from the learner data stored in the learner data storage unit 174, and supplies the prediction taps to the adder 190. The tap extracting unit 176 determines class taps for the subject pixel from the learner data stored in the learner data storage unit 174 and supplies the class taps to the classification unit 177.

Then, in step S1123, the classification unit 177 classifies the subject pixel based on the class taps supplied from the tap extracting unit 176, and outputs the class code associated with the determined class to the adder 190.

In step S1124, the adder 190 reads the subject pixel from the supervisor data storage unit 172, and performs addition for the subject pixel and the pixels of the learner data forming the prediction taps supplied from the tap extracting unit 175 according to equation (8) composed of normal equations which are established for the class associated with the class code supplied from the classification unit 177.

The tap extracting unit 175 then determines in step S1125 whether there is any unselected pixel of the supervisor data stored in the supervisor data storage unit 172. If an unselected pixel is found in step S1125, the tap extracting unit 175 sets the unselected pixel as the subject pixel, and returns to step S1122. Step S1122 and the subsequent steps are then repeated.

If it is determined in step S1125 that there is no unselected pixel of the supervisor data, the adder 190 supplies the matrix in the left side and the vector in the right side of equation (8) established for each class to the tap coefficient calculator 191.

Then, in step S1126, the tap coefficient calculator 191 solves the normal equations in equation (8) for each class supplied from the adder 190 to determine a set of tap coefficients $w_n$ for each class. The processing is then completed.

Because of an insufficient number of learning image data, there may be some classes for which it is difficult to determine a sufficient number of normal equations necessary for finding a tap coefficient. For such classes, the tap coefficient calculator 191 outputs a default tap coefficient.

In the learning device, the learner data generator 173 employs a plurality of up-conversion techniques for obtaining quasi-HD image data generated in the process of the generation of SD image data, which serves as learner data, to obtain a plurality of learner data associated with the plurality of up-conversion techniques. By using the plurality of learner data, the learner data generator 173 determines a plurality of sets of tap coefficients corresponding to the plurality of up-conversion techniques.

In the coefficient memory 164 of the image converter 48 shown in FIG. 5, a plurality of sets of tap coefficients $w_m$ for the individual classes obtained as described above are stored.

The image converter 46 or 47 shown in FIG. 3 is formed similarly to the image converter 48 shown in FIG. 5. However, the coefficient selector 160 indicated by the broken lines in FIG. 5 is not provided for the image converter 46 or 47, and sets of tap coefficients stored in the coefficient memory 164 of the image converter 46 or 47 are different from those in the image converter 48.

More specifically, the image converter 46 sets HD image data as the first image data and higher quality HD image data as the second image data, and then converts the first image data to the second image data. Accordingly, sets of tap coefficients obtained by performing the learning processing shown in FIG. 8 by using the first image data as learner data and the second image data as supervisor data are stored in the coefficient memory 164 of the image converter 46.

The image converter 47 sets D1 image data or quasi-D1 image data as the first image data and HD image data as the second image data, and then converts the first image data to the second image data. Accordingly, sets of tap coefficients obtained by performing the learning processing shown in FIG. 8 by using the first image data as learner data and the second image data as supervisor data are stored in the coefficient memory 164 of the image converter 47.

Figure 8:
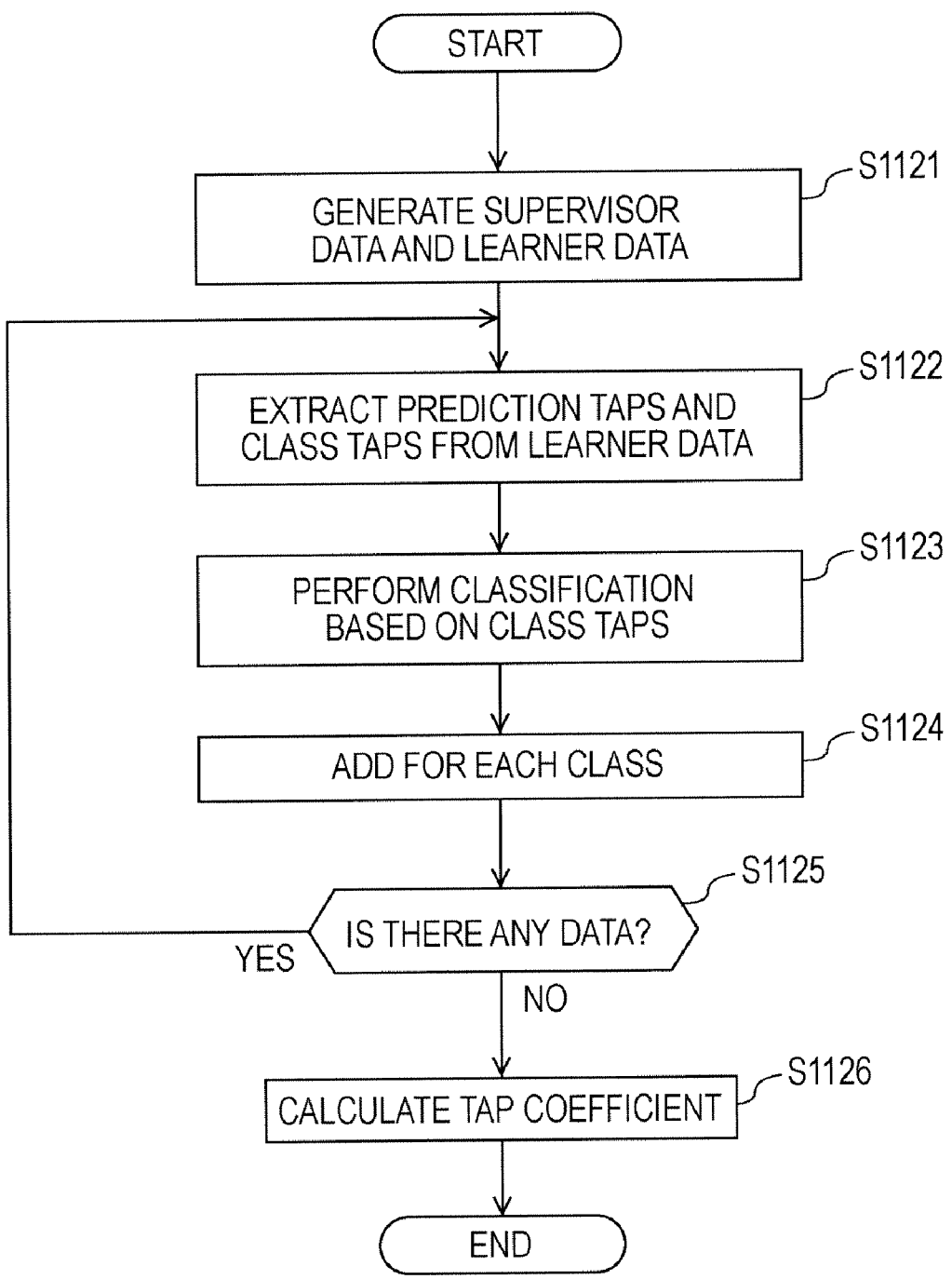
FIG. 8 is a flowchart illustrating processing for learning tap coefficients.

In the learning processing shown in FIG. 8, in the learner data generator 173, SD image data obtained by down-converting quasi-HD image data is used as the learner data. Alternatively, component-signal SD image data of quality equivalent to SD image data output from the SD camera 11 (FIG. 2) may be generated by down-converting HD image data, which is the supervisor data, and the component-signal SD image data may be converted to composite-signal SD image data, and then, the composite-signal SD image data may be reconverted to component-signal SD image data of quality equivalent to image data output from the NTSC decoder 22 shown in FIG. 2. Then, the resulting SD image data may be used as the learner data.

Figure 9:
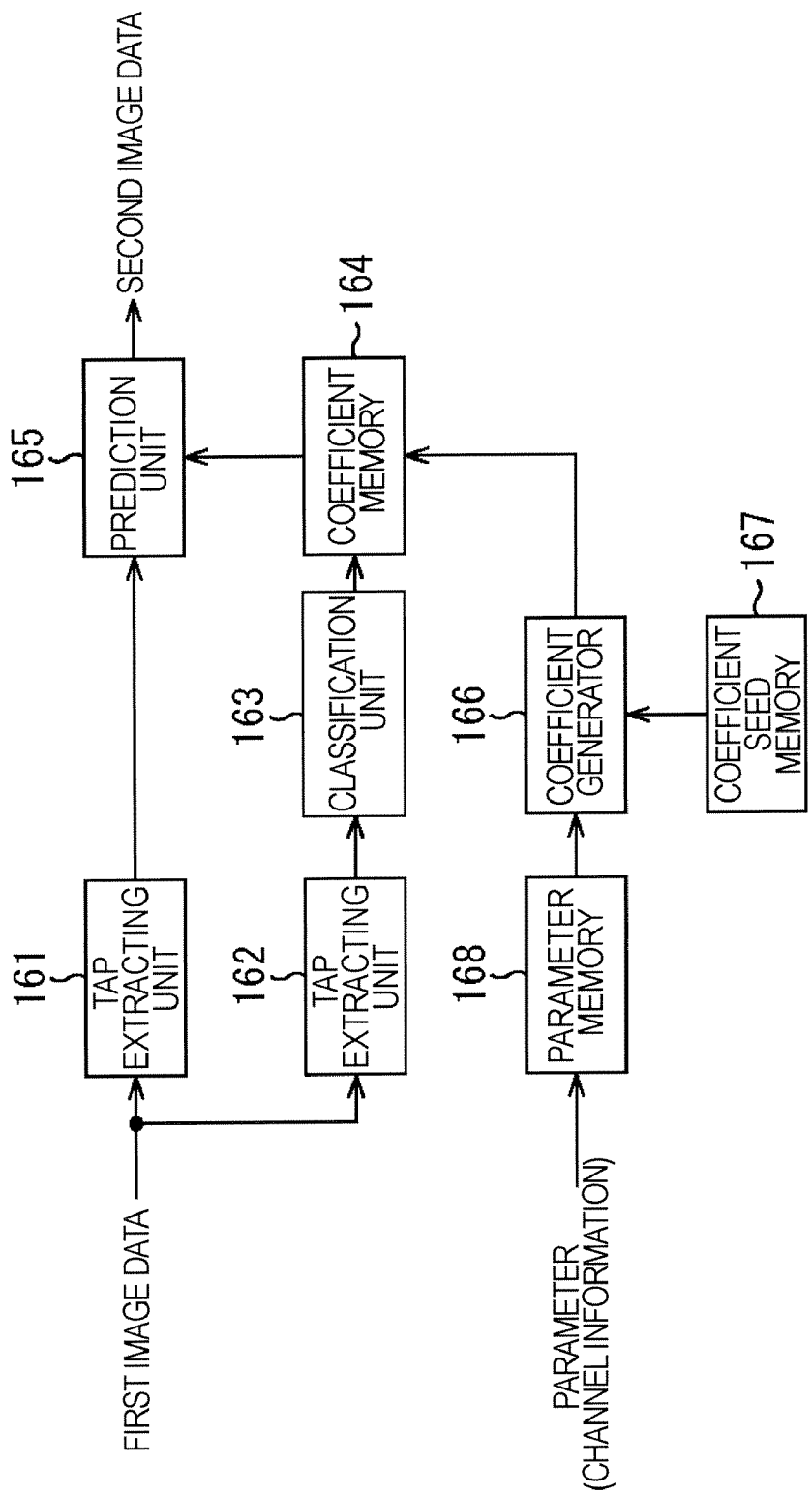
FIG. 9 is a block diagram illustrating another example of the configuration of the image converter.

FIG. 9 is a block diagram illustrating another example of the functional configuration of the image converter 48 shown in FIG. 3. In FIG. 9, elements corresponding to those in FIG. 5 are designated with like reference numerals, and an explanation thereof is thus omitted.

The image converter 48 shown in FIG. 9 is similar to the image converter 48 shown in FIG. 5 in that the tap extracting units 161 and 162, the classification unit 163, the coefficient memory 164, and the prediction unit 165 are provided. However, in the image converter 48 shown in FIG. 9, instead of the coefficient selector 160, which is provided for the image converter 48 shown in FIG. 5, a coefficient generator 166, a coefficient seed memory 167, and a parameter memory 168 are provided.

The coefficient generator 166 generates a set of tap coefficients for each class based on coefficient seed data stored in the coefficient seed memory 167 and a parameter stored in the parameter memory 168, and then stores the generated set of tap coefficients in the coefficient memory 164 by overwriting the previous set of tap coefficients stored in the coefficient memory 164.

The coefficient seed memory 167 stores therein coefficient seed data for each class obtained by conducting learning of coefficient seed data, which is described below. The coefficient seed data serves as the so-called "seed" for generating tap coefficients.

The parameter memory 168 stores therein channel information supplied from the tuner 41 (FIG. 3) as a parameter used for generating tap coefficients, by overwriting the previous parameter stored in the parameter memory 168.

The image conversion processing performed by the image converter 48 shown in FIG. 9 is described below with reference to the flowchart in FIG. 10.

The tap extracting unit 161 sequentially sets, as a subject pixel, pixels forming the HD image data as the second image data corresponding to the SD image data as the first image data supplied from the down-converter 45 (FIG. 3). Then, in step S1211, the parameter memory 168 determines whether new channel information different from the channel information currently stored in the parameter memory 168 as parameters has been supplied from the tuner 41 (FIG. 3). If it is determined in step S1211 that new channel information has been supplied, the process proceeds to step S1212 in which the parameter memory 168 stores the new channel information by overwriting the previous channel information.

If it is determined in step S1211 that new channel information has not been supplied, the process proceeds to step S1213 by skipping step S1212.

Accordingly, in the parameter memory 168, channel information concerning the channel that broadcasts quasi-HD image data before being down-converted to the SD image data, which is the first image data, supplied to the image converter 48 from the down-converter 45 (FIG. 3) is stored as the parameters.

In step S1213, the coefficient generator 166 reads a set of coefficient seed data for each class from the coefficient seed memory 167, and also reads the corresponding parameter from the parameter memory 168 to determine a set of tap coefficients for each class based on the coefficient seed data and the parameter. Then, in step S1214, the coefficient generator 166 supplies a set of tap coefficients for each class to the coefficient memory 164 by overwriting the previous set of tap coefficients.

In step S1215, the tap extracting units 161 and 162 extract prediction taps and class taps, respectively, for the subject pixel from the SD image data, which serves as the first image data, supplied from the down-converter 45 (FIG. 3). The tap extracting unit 161 supplies the prediction taps to the prediction unit 165, while the tap extracting unit 162 supplies the class taps to the classification unit 163.

In step S1216, upon receiving the class taps for the subject pixel from the tap extracting unit 162, the classification unit 163 classifies the subject pixel based on the class taps, and also outputs the class code representing the determined class to the coefficient memory 164.

In step S1217, the coefficient memory 164 reads and outputs the tap coefficient stored at the address corresponding to the class code supplied from the classification unit 163, i.e., the tap coefficient associated with the class of the subject pixel. The coefficient memory 164 also outputs the tap coefficient to the prediction unit 165.

Then, in step S1218, the prediction unit 165 performs predetermined prediction calculations by using the prediction taps output from the tap extracting unit 161 and the tap coefficient obtained from the coefficient memory 164 to determine the pixel value of the subject pixel.

The tap extracting unit 161 then determines in step S1219 whether there is any unselected pixel of the second image data. If an unselected pixel is found in step S1219, the tap extracting unit 161 sets the unselected pixel as the subject pixel and returns to step S1211. Step S1211 and the subsequent steps are then repeated.

If it is determined in step S1219 that there is no unselected pixel of the second image data, the processing is completed.

Figure 10:
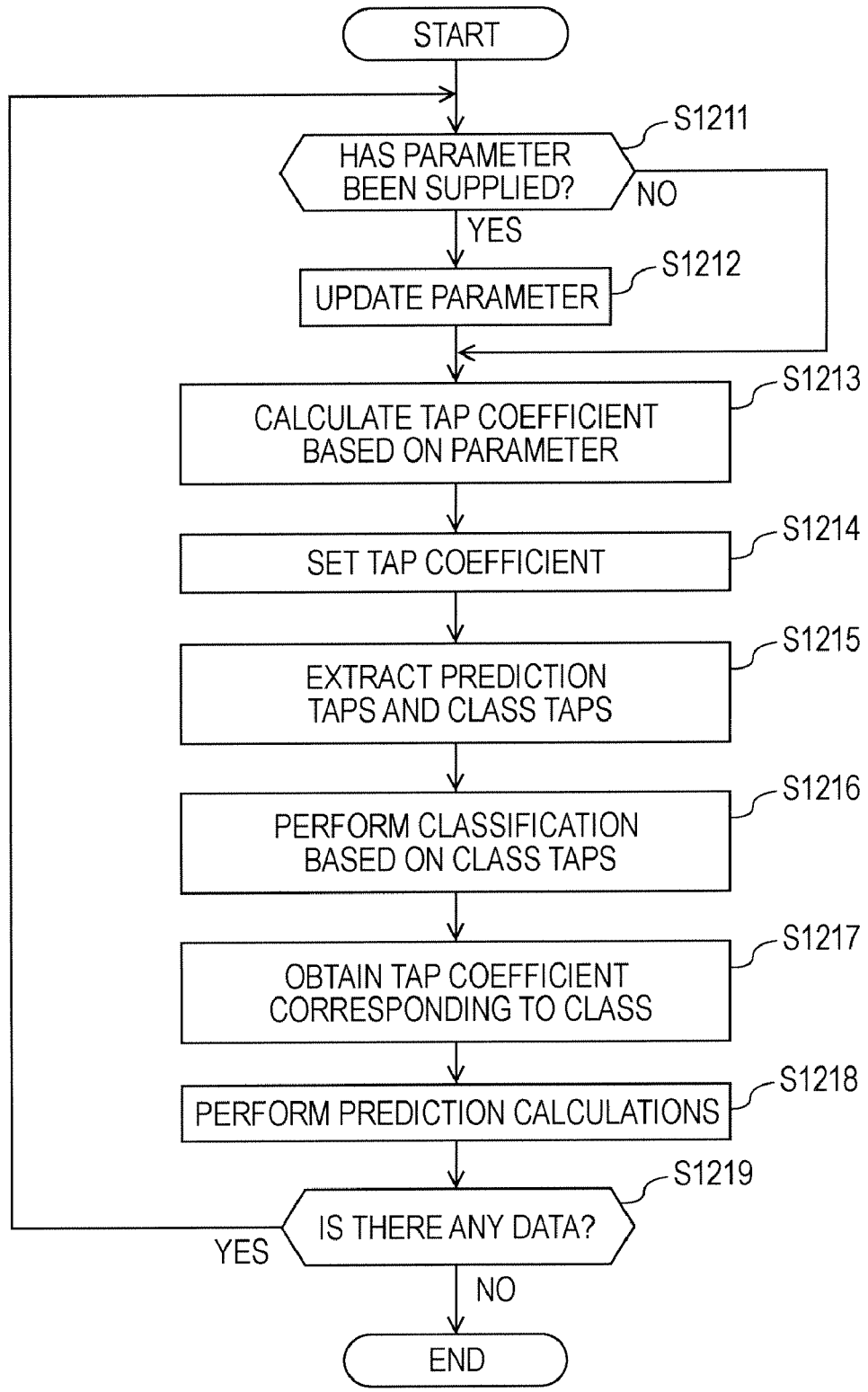
FIG. 10 is a flowchart illustrating processing performed by the image converter.

In the flowchart in FIG. 10, steps S1213 and S1214 may be executed only when the previous parameter is overwritten by a new parameter in the parameter memory 168, and if not, steps S1213 and S1214 may be omitted.

Prediction calculations performed by the prediction unit 165, generation of tap coefficients by the coefficient generator 166, and learning of coefficient seed data stored in the coefficient seed memory 167 are discussed below.

As in the image converter 48 shown in FIG. 5, the image converter 48 shown in FIG. 9 sets the SD image data output from the down-converter 45 (FIG. 3) as the first image data and sets HD image data as the second image data, and then converts the first image data into the second image data by using the tap coefficient for each class according to, for example, the linear prediction calculations expressed by equation (1).

In the image converter 48 shown in FIG. 9, however, the coefficient generator 166 generates the tap coefficient $w_n$ from the coefficient seed data stored in the coefficient seed memory 167 and the corresponding parameter stored in the parameter memory 168. It is now assumed that the coefficient generator 166 generates the tap coefficient $w_n$ by using the coefficient seed data and the parameter according to, for example, equation (9):

$$w_n = \sum_{m=1}^{M} \beta_{m,n} z^{m-1} \tag{9}$$

where $\beta_{m,n}$ designates the m-th coefficient seed data used for determining the n-th tap coefficient $w_n$, and z represents the parameter. In equation (9), the tap coefficient $w_n$ is determined by using M coefficient seed data $\beta_{1,n}, \beta_{2,n}, \ldots,$ and $\beta_{M,n}$.

The equation for determining the tap coefficient $w_n$ from the coefficient seed data $\beta_{m,n}$ and the parameter z is not restricted to equation (9).

The value $z^{m-1}$ determined by the parameter z in equation (9) is defined by equation (10) by introducing a new variable $t_m$.

$$t_m = z^{m-1} \; (m=1, 2, \ldots, M) \tag{10}$$

By substituting equation (10) into equation (9), equation (11) can be found.

$$w_n = \sum_{m=1}^{M} \beta_{m,n} t_m \tag{11}$$

According to equation (11), the tap coefficient $w_n$ can be found by the linear equation of the coefficient seed data $\beta_{m,n}$ and the variable $t_m$.

When the true value of the pixel value of the k-th sample high quality pixel is indicated by $y_k$ and when the prediction value of the true value $y_k$ obtained by equation (1) is indicated by $y_k'$, the prediction error $e_k$ can be determined by equation (12), which is similar to equation (2).

$$e_k = y_k - y_k' \tag{12}$$

Since the prediction value $y_k'$ in equation (12) is determined by equation (1), equation (13) similar to equation (3) can be found by substituting $y_k'$ in equation (12) into equation (1):

$$e_k = y_k - \left( \sum_{n=1}^{N} w_n x_{n,k} \right) \tag{13}$$

where $x_{n,k}$ indicates the n-th low quality pixel forming the prediction taps for the k-th sample high quality pixel.

By substituting equation (11) into $w_n$ in equation (13), equation (14) can be found.

$$e_k = y_k - \left(\sum_{n=1}^{N}\left(\sum_{m=1}^{M}\beta_{m,n}t_m\right)x_{n,k}\right) \quad (14)$$

The coefficient seed data $\beta_{m,n}$ that sets the prediction error $e_k$ in equation (14) to be 0 is the optimal coefficient seed data for predicting the corresponding high quality pixel. Generally, however, it is difficult to determine such coefficient seed data $\beta_{m,n}$ for all high quality pixels.

Thus, if, for example, the least square method is used as the standard for indicating that the coefficient seed data $\beta_{m,n}$ is optimal, the optimal coefficient seed data $\beta_{m,n}$ can be determined by minimizing the sum E of the square errors expressed by equation (15):

$$E = \sum_{k=1}^{K} e_k^2 \quad (15)$$

where K indicates the number of sample sets (number of learning samples) of the high quality pixel $y_k$ and low quality pixels $x_{1,k}, x_{2,k}, \ldots,$ and $x_{N,k}$ forming the prediction taps for the high quality pixel $y_k$.

The minimum value of the sum E of the square errors in equation (15) can be determined by the coefficient seed data $\beta_{m,n}$ that sets the result obtained by partially differentiating the sum E with the coefficient seed data to be 0, as expressed by equation (16).

$$\frac{\partial E}{\partial \beta_{m,n}} = \sum_{k=1}^{K} 2 \cdot \frac{\partial e_k}{\partial \beta_{m,n}} \cdot e_k = 0 \quad (16)$$

By substituting equation (13) into equation (16), equation (17) can be found.

$$\sum_{k=1}^{K} t_m x_{n,k} e_k = \sum_{k=1}^{K} t_m x_{n,k} \left(y_k - \left(\sum_{n=1}^{N}\left(\sum_{m=1}^{M}\beta_{m,n}t_m\right)x_{n,k}\right)\right) = 0 \quad (17)$$

$X_{i,p,j,q}$ and $Y_{i,p}$ are defined by equation (18) and equation (19), respectively.

$$X_{i,p,j,q} = \sum_{k=1}^{K} x_{i,k} t_p x_{j,k} t_q \quad (18)$$

$(i = 1, 2, \ldots, N; j = 1, 2,$
$\ldots, N; p = 1, 2, \ldots, M; q = 1, 2, \ldots, M)$ $$Y_{i,p} = \sum_{k=1}^{K} x_{i,k} t_p y_k \quad (19)$$

In this case, equation (17) can be expressed by normal equations in equation (20) using $X_{i,p,j,q}$ and $Y_{i,p}$.

$$\begin{bmatrix} X_{1,1,1,1} & X_{1,1,1,2} & \cdots & X_{1,1,1,M} & X_{1,1,2,1} & \cdots & X_{1,1,N,M} \\ X_{1,2,1,1} & X_{1,2,1,2} & \cdots & X_{1,2,1,M} & X_{1,2,2,1} & \cdots & X_{1,2,N,M} \\ \vdots & \vdots & \ddots & \vdots & \vdots & & \vdots \\ X_{1,M,1,1} & X_{1,M,1,2} & \cdots & X_{1,M,1,M} & X_{1,M,2,1} & \cdots & X_{1,M,N,M} \\ X_{2,1,1,1} & X_{2,1,1,2} & \cdots & X_{2,M,1,M} & X_{2,M,2,1} & \cdots & X_{2,M,N,M} \\ \vdots & \vdots & & \vdots & \vdots & \ddots & \vdots \\ X_{N,M,1,1} & X_{N,M,1,2} & \cdots & X_{N,M,1,M} & X_{N,M,2,1} & \cdots & X_{N,M,N,M} \end{bmatrix} \quad (20)$$

$$\begin{bmatrix} \beta_{1,1} \\ \beta_{2,1} \\ \vdots \\ \beta_{M,1} \\ \beta_{1,2} \\ \vdots \\ \beta_{M,N} \end{bmatrix} = \begin{bmatrix} Y_{1,1} \\ Y_{1,2} \\ \vdots \\ Y_{1,M} \\ Y_{2,1} \\ \vdots \\ Y_{N,M} \end{bmatrix}$$

The normal equations expressed by equation (20) can be solved with respect to the coefficient seed data $\beta_{m,n}$ by using, for example, a sweeping out method.

In the image converter 48 shown in FIG. 9, the coefficient seed data $\beta_{m,n}$ determined by conducting learning for solving equation (20) by using, as the supervisor data, many high quality pixels $y_1, y_2, \ldots,$ and $y_k$ of an image of quality equivalent to HD image data, which is the second image data, and by using, as the learner data, low quality pixels $x_{1,k}, x_{2,k}, \ldots,$ and $x_{N,k}$ of quality equivalent to the SD image data, which is the first image data, down-converted from the quasi-HD image data is stored in the coefficient seed memory 167. The coefficient generator 166 generates the tap coefficient $w_n$ from the coefficient seed data $\beta_{m,n}$ and the parameter z stored in the parameter memory 168 according to equation (9). Then, the prediction unit 165 calculates equation (1) by using the tap coefficient $w_n$ and the pixels $x_n$ of the first image data forming the prediction taps for the subject pixel to determine the prediction value of the pixel value of the subject pixel forming the second image data.

Figure 11:
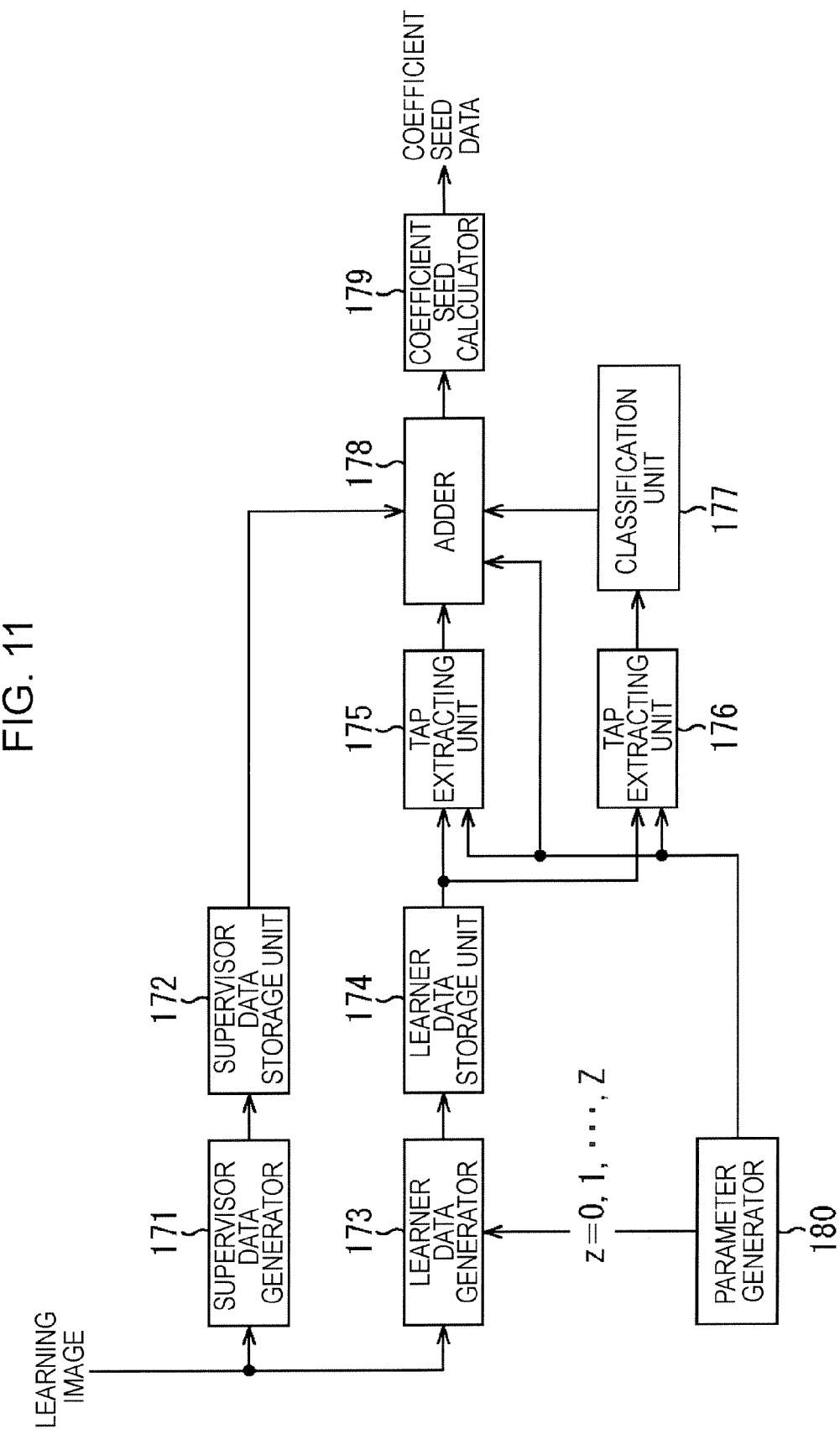
FIG. 11 is a block diagram illustrating another example of the configuration of a learning device for learning coefficient seed data.

FIG. 11 is a block diagram illustrating another example of the configuration of the learning device for conducting learning for determining the coefficient seed data $\beta_{m,n}$ by solving the normal equations expressed by equation (20). In FIG. 11, elements similar to those in FIG. 7 are designated with like reference numerals, and an explanation thereof is thus omitted.

Learning image data used for learning of the coefficient seed data $\beta_{m,n}$ is supplied to the learning device, and more particularly, to the supervisor data generator 171 and the learner data generator 173.

As discussed with reference to FIG. 7, the supervisor data generator 171 generates supervisor data of quality equivalent to HD image data, which serves as the second image data, from the learning image data, and supplies the generated supervisor data to the supervisor data storage unit 172.

The supervisor data storage unit 172 stores the HD image data as the supervisor data supplied from the supervisor data generator 171.

As discussed with reference to FIG. 7, the learner data generator 173 generates learner data of quality equivalent to SD image data, which serves as the first image data, from the learning image data, and supplies the generated learner data to the learner data storage unit 174.

In the learning device shown in FIG. 11, however, the learner data generator 173 generates learner data corresponding to the parameter z supplied from a parameter generator 180.

That is, the learner data generator 173 receives, not only the learning image data, but also several values that can be determined as the channel information as the parameter z stored in the parameter memory 168 shown in FIG. 9 from the parameter generator 180. More specifically, for example, z=0, 1, 2, ..., and Z are supplied to the learner data generator 173 from the parameter generator 180.

As discussed with reference to FIG. 7, the learner data generator 173 generates supervisor data from the learning image data in a manner similar to the supervisor data generator 171, and then, down-converts the HD image data to generate component-signal SD image data of image quality equivalent to SD image data output from the SD camera 11 (FIG. 2). The learner data generator 173 then converts the component-signal SD image data into composite-signal SD image data in a manner similar to the broadcasting station 1 (FIG. 2), and up-converts the composite-signal SD image data by reconverting it into component-signal SD image data, thereby generating quasi-HD image data. Thereafter, the learner data generator 173 down-converts the quasi-HD image data in a manner similar to the down-converter 45 (FIG. 3), and supplies the resulting SD image data to the learner data storage unit 174 as learner data.

As the up-conversion technique for obtaining quasi-HD image data generated in the process of the generation of SD image data as the learner data, the learner data generator 173 employs the up-conversion technique associated with the parameter z supplied from the parameter generator 180.

That is, the learner data generator 173 generates quasi-HD image data by performing up-conversion by using the same up-conversion technique as that for obtaining the quasi-HD image data in a broadcasting station associated with the channel represented by the channel information, which serves as the parameter z.

Then, the learner data generator 173 down-converts the quasi-HD image data to SD image data and supplies it to the learner data storage unit 174 as the learner data.

Accordingly, in the learner data generator 173, SD image data of quality equivalent to SD image data obtained by down-converting quasi-HD image data which is broadcast in the channel represented by the channel information as the parameter z can be obtained as the learner data.

In this case, in the learner data generator 173, (Z+1) learner data corresponding to parameter z=0, 1, 2, ..., and Z associated with different up-conversion techniques can be generated.

The learner data storage unit 174 stores (Z+1) SD image data as the learner data supplied from the learner data generator 173.

The tap extracting unit 175 sets, as a subject pixel, pixels forming the HD image data as the supervisor data stored in the supervisor data storage unit 172, and extracts predetermined pixels forming the SD image data as the learner data stored in the learner data storage unit 174 to determine prediction taps having the same tap structure as that of the prediction taps obtained by the tap extracting unit 161 shown in FIG. 9. The tap extracting unit 175 then supplies the prediction taps to an adder 178.

The tap extracting unit 176 extracts predetermined pixels forming the SD image data as the learner data stored in the learner data storage unit 174 to determine class taps having the same tap structure as that of the class taps obtained by the tap extracting unit 162 shown in FIG. 9. The tap extracting unit 176 then supplies the class taps to the classification unit 177.

Upon receiving the parameter z generated by the parameter generator 180, the tap extracting units 175 and 176 generate the prediction taps and the class taps, respectively, by using the learner data associated with the parameter z supplied from the parameter generator 180.

The classification unit 177 performs classification in a manner similar to the classification unit 163 shown in FIG. 9 based on the class taps output from the tap extracting unit 176, and outputs the class code corresponding to the determined class to the adder 178.

The adder 178 then reads the subject pixel from the supervisor data storage unit 172, and performs addition for the subject pixel, the learner data forming the prediction taps supplied from the tap extracting unit 175, and the parameter z associated with the learner data for each class code supplied from the classification unit 177.

That is, not only the supervisor data $y_k$ stored in the supervisor data storage unit 172, the prediction taps $x_{i,k}$ ($x_{j,k}$) output from the tap extracting unit 175, and the class code output from the classification unit 177, but also the parameter z generated when generating the learner data used for the prediction taps, from the parameter generator 180, are supplied to the adder 178.

The adder 178 then performs calculations, such as multiplications ($x_{i,k}t_p x_{j,k}t_q$) of the learner data and the parameter z and the summation ($\Sigma$) for determining the component $X_{i,p,j,q}$ defined in equation (18) in the matrix of the left side in equation (20) for each class associated with the class code supplied from the classification unit 177 by using the prediction taps (learner data) $x_{i,k}$ ($x_{j,k}$) and the parameter z. In equation (18), $t_p$ is calculated from the parameter z according to equation (10). The same applies to $t_q$ in equation (18).

The adder 178 also performs calculations, such as multiplications ($x_{i,k}t_p y_k$) of the learner data $x_{i,k}$, the supervisor data $y_k$, and the parameter z and the summation ($\Sigma$) for determining the component $Y_{i,p}$ defined in equation (19) in the vector of the right side in equation (20) for each class associated with the class code supplied from the classification unit 177 by using the prediction taps (learner data) $x_{i,k}$, the supervisor data $y_k$, and the parameter z. In equation (19), $t_p$ is calculated from the parameter z according to equation (10).

That is, the adder 178 stores in a built-in memory (not shown) the component $X_{i,p,j,q}$ in the matrix of the left side and the component $Y_{i,p}$ in the vector of the right side in equation (20), which are determined for the previous subject pixel of the supervisor data, and then adds (addition represented by the summations in equation (18) or equation (19)) the corresponding component $x_{i,k}t_p x_{j,k}t_q$ or $x_{i,k}t_p y_k$ calculated by using the supervisor data $y_k$, the learner data $x_{i,k}(x_{j,k})$, and the parameter z for the current subject pixel of the supervisor data to the component $X_{i,p,j,q}$ or the component $Y_{i,p}$, respectively.

The adder 178 performs the above-described addition on all the pixels of the supervisor data stored in the supervisor data storage unit 172 with respect to all the parameter z (0, 1, ..., and Z) to establish the normal equations expressed by equation (20) for each class, and then supplies the normal equations to a coefficient seed calculator 179.

The coefficient seed calculator 179 solves the normal equations for each class supplied from the adder 178 to determine the coefficient seed data $\beta_{m,n}$ for each class.

The parameter generator 180 generates several values that can be determined as the parameter z supplied to the parameter memory 168 shown in FIG. 9, for example, Z=0, 1, 2, ..., and Z, and supplies the generated parameter z to the learner data generator 173. The parameter generator 180 also supplies the generated parameter z to the tap extracting units 175 and 176 and the adder 178.

Figure 12:
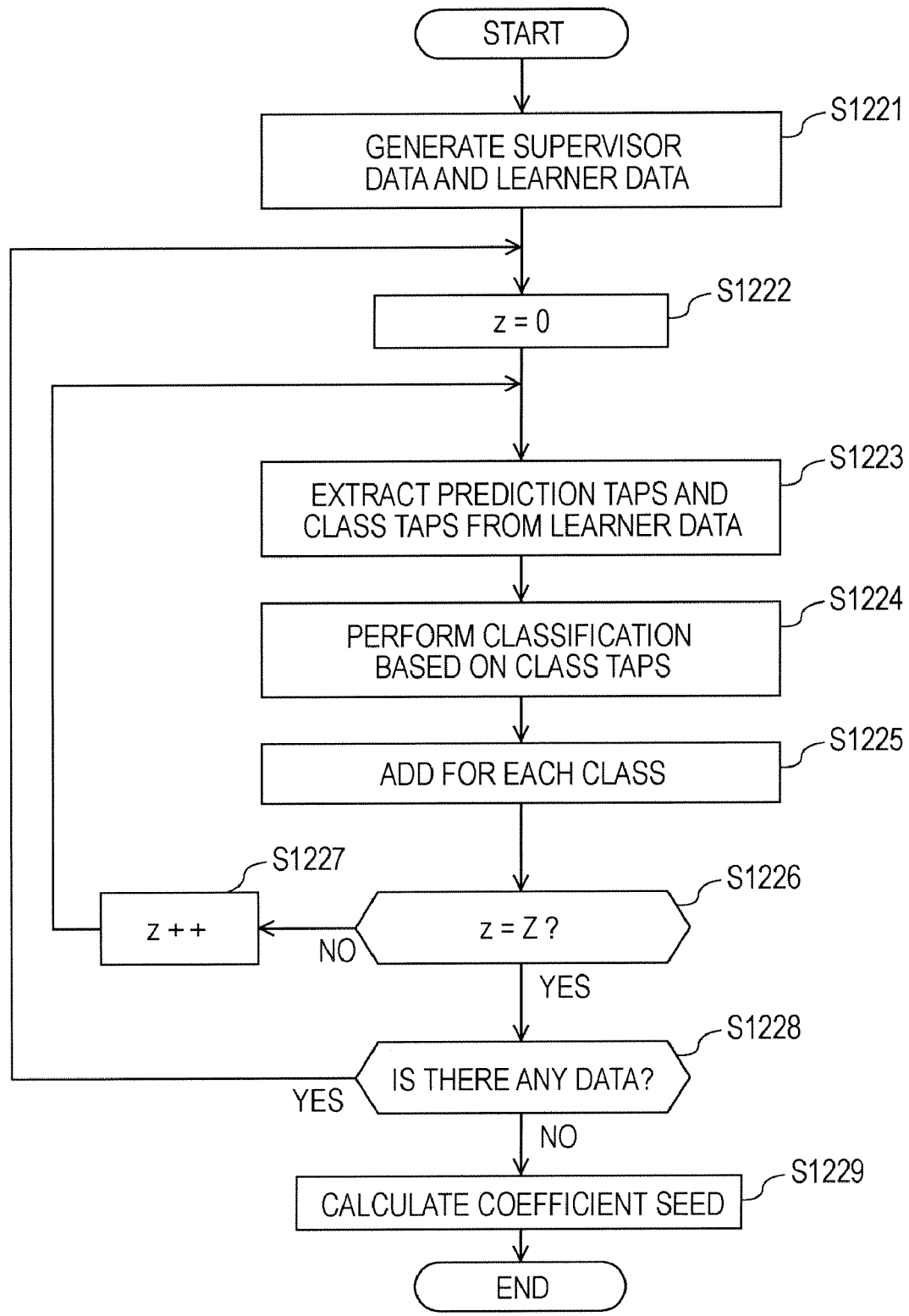
FIG. 12 is a flowchart illustrating processing for learning coefficient seed data.

A description is now given, with reference to the flowchart in FIG. 12, of the learning processing performed by the learning device shown in FIG. 11.

In step S1221, the supervisor data generator 171 generates supervisor data of quality equivalent to HD image data, which is the second image data, from the learning image data.

The learner data generator 173 performs processing, such as up-conversion in accordance with each value of (Z+1) (0, 1, ..., and Z) of the parameter z output from the parameter generator 180, to generate (Z+1) learner data of quality equivalent to SD image data, which is the first image data, from the learner image data.

The supervisor data output from the supervisor data generator 171 is supplied to the supervisor data storage unit 172 and is stored therein, and the (Z+1) learner data output from the learner data generator 173 are supplied to the learner data storage unit 174 and are stored therein.

Then, in step S1222, the parameter generator 180 sets the parameter z to the initial value, for example, to 0, and supplies the parameter z to the tap extracting units 175 and 176 and the adder 178.

In step S1223, the tap extracting unit 175 sets, as a subject pixel, an unselected pixel of the supervisor data stored in the supervisor data storage unit 172. The tap extracting unit 175 then extracts pixels from the learner data corresponding to the parameter z output from the parameter generator 180 and stored in the learner data storage unit 174 to generate prediction taps, and supplies them to the adder 178. The tap extracting unit 176 also extracts pixels from the learner data corresponding to the parameter z output from the parameter generator 180 and stored in the learner data storage unit 174 to generate class taps, and supplies them to the classification unit 177.

Then, in step S1224, the classification unit 177 classifies the subject pixel based on the class taps, and outputs the class code associated with the determined class to the adder 178.

In step S1225, the adder 178 reads the subject pixel from the supervisor data storage unit 172, and calculates the component $x_{i,k}t_p x_{j,k}t_q$ in the matrix of the left side and the component $x_{i,k}t_p y_k$ in the vector of the right side of equation (20) by using the subject pixel, the prediction taps supplied from the tap extracting unit 175, and the parameter z output from the parameter generator 180. The adder 178 then adds the matrix component $x_{i,k}t_p x_{j,k}t_q$ and the vector component $x_{i,k}t_p y_k$ calculated from the subject pixel, the prediction taps, and the parameter z to the previous components associated with the class code output from the classification unit 177.

The parameter generator 180 determines in step S1226 whether the parameter z output from the parameter generator 180 is equal to the maximum value Z. If it is found in step S1226 that the parameter z is not equal to the maximum value Z (less than the maximum value Z), the process proceeds to step S1227. In step S1227, the parameter generator 180 increments the parameter z by one, and outputs the resulting parameter to the tap extracting units 175 and 176 and the adder 178 as the new parameter z. The process then returns to step S1223.

If the parameter z is found to be equal to the maximum value Z in step S1226, the process proceeds to step S1228 to determine whether there is any unselected pixel of the supervisor data stored in the supervisor data storage unit 172. If an unselected pixel is found in step S1228, the tap extracting unit 175 sets the unselected pixel as the subject pixel and returns to step S1222. Then, step S1222 and the subsequent steps are repeated.

If it is determined in step S1228 that there is no unselected pixel of the supervisor data, the adder 178 supplies the matrix in the left side and the vector in the right side in equation (20) obtained for each class to the coefficient seed calculator 179.

Then, in step S1229, the coefficient seed calculator 179 solves the normal equations in equation (20) for each class to determine the coefficient seed data $\beta_{m,n}$ for the corresponding class. The processing is then completed.

Because of an insufficient number of learning image data, there may be some classes for which it is difficult to determine a sufficient number of normal equations necessary for finding coefficient seed data. For such classes, the coefficient seed calculator 179 outputs default coefficient seed data.

In the learning device shown in FIG. 11, learning is conducted for directly determining the coefficient seed data $\beta_{m,n}$ that minimizes the sum of the square errors of the prediction value y of the supervisor data to be predicted in the linear prediction equation in equation (1) by using HD image data as the supervisor data and by using, as the learner data, SD image data corresponding to the parameter z generated from the HD image data. Alternatively, the coefficient seed data $\beta_{m,n}$ may be learned, as shown in FIG. 13.

Figure 13:
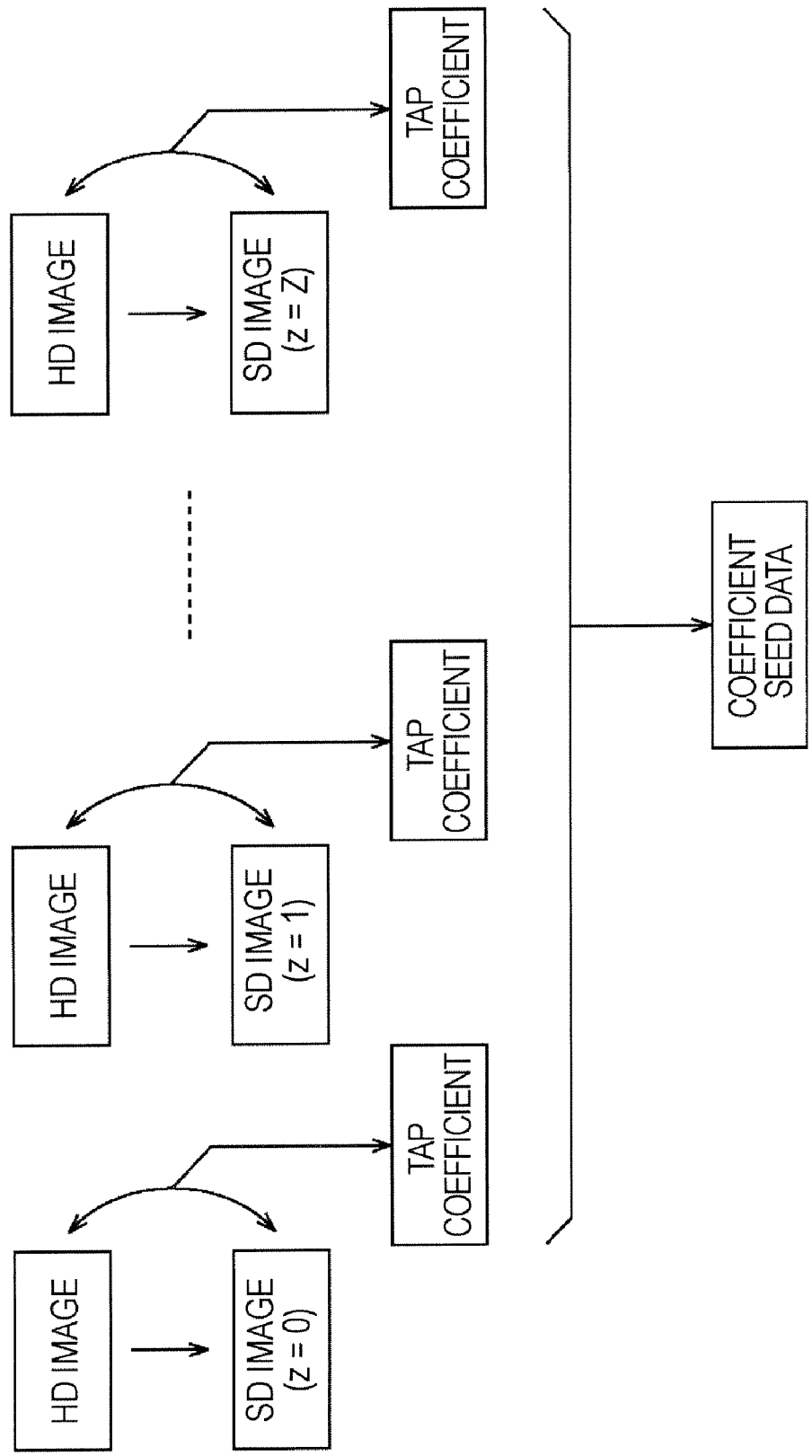
FIG. 13 illustrates another approach to learning coefficient seed data.

In the modified example shown in FIG. 13, by using, as the learner data, SD image data corresponding to the parameter z generated from HD image data, which is the supervisor data, the tap coefficient $w_n$ that minimizes the sum of the square errors of the prediction value y of the supervisor data predicted in the linear prediction equation in equation (1) is determined for each value of the parameter z (z=0, 1, ..., and Z) by using the tap coefficient $w_n$ and the learner data $x_n$. Then, learning is conducted, by using the determined tap coefficient $w_n$ as the supervisor data and the parameter z as the learner data, for determining the coefficient seed data $\beta_{m,n}$ that minimizes the sum of the square errors of the prediction value of the tap coefficient $w_n$, which is the supervisor data, predicted from the coefficient seed data $\beta_{m,n}$ and the variable $t_m$ associated with the parameter z according to equation (11).

That is, as in the learning device shown in FIG. 7, the optimal tap coefficient $w_n$, i.e., the tap coefficient $w_n$ that minimizes the sum E of the square errors of the prediction value y of the supervisor data to be predicted by the linear prediction equation in equation (1), can be determined for each value of the parameter z (z=0, 1, ..., and Z) for each class by solving the normal equations in equation (8).

According to equation (11), the tap coefficient can be determined from the coefficient seed data $\beta_{m,n}$ and the variable $t_m$ corresponding to the parameter z. If the tap coefficient determined by equation (11) is $w_n'$, the coefficient seed data $\beta_{m,n}$ that sets the error en between the optimal tap coefficient $w_n$ and the tap coefficient $w_n'$, determined in equation (11), as expressed by equation (21), to be 0 is the optimal coefficient seed data that determines the optimal tap coefficient $w_n$. It is difficult, however, to determine such coefficient seed data $\beta_{m,n}$ for all tap coefficients $w_n$.

$$e_n = w_n - w_n' \quad (21)$$

Equation (21) can be modified into equation (22) by substituting equation (11) into equation (21).

$$e_n = w_n - \left(\sum_{m=1}^{M} \beta_{m,n} t_m\right) \quad (22)$$

If, for example, the least square method is used as the standard for indicating that the coefficient seed data $\beta_{m,n}$ is optimal, the optimal coefficient seed data $\beta_{m,n}$ can be determined by minimizing the sum E of the square errors expressed by equation (23).

$$E = \sum_{n=1}^{M} e_n^2 \quad (23)$$

The minimum value of the sum E of the square errors in equation (23) can be determined by the coefficient seed data $\beta_{m,n}$ that sets the result obtained by partially differentiating the sum E with the coefficient seed data $\beta_{m,n}$ to be 0, as expressed by equation (24).

$$\frac{\partial E}{\partial \beta_{m,n}} = \sum_{m=1}^{M} 2 \frac{\partial e_n}{\partial \beta_{m,n}} \cdot e_n = 0 \quad (24)$$

By substituting equation (22) into equation (24), equation (25) can be found.

$$\sum_{m=1}^{M} t_m \left( w_n - \left(\sum_{m=1}^{M} \beta_{m,n} t_m\right) \right) = 0 \quad (25)$$

$X_{i,j}$ and $Y_i$ are defined as expressed by equation (26) and equation (27), respectively.

$$X_{i,j} = \sum_{z=0}^{Z} t_i t_j \ (i = 1, 2, \cdots, M; j = 1, 2, \cdots, M) \quad (26)$$

$$Y_i = \sum_{z=0}^{Z} t_i w_n \quad (27)$$

In this case, equation (25) can be expressed by normal equations in equation (28) using $X_{i,j}$ and $Y_i$.

$$\begin{bmatrix} X_{1,1} & X_{1,2} & \cdots & X_{1,M} \\ X_{2,1} & X_{2,1} & \cdots & X_{2,2} \\ \vdots & \vdots & \ddots & \vdots \\ X_{M,1} & X_{M,2} & \cdots & X_{M,M} \end{bmatrix} \begin{bmatrix} \beta_{1,n} \\ \beta_{2,n} \\ \vdots \\ \beta_{M,n} \end{bmatrix} = \begin{bmatrix} Y_1 \\ Y_2 \\ \vdots \\ Y_M \end{bmatrix} \quad (28)$$

The normal equations expressed by equation (28) can be solved with respect to the coefficient seed data $\beta_{m,n}$ by using, for example, a sweeping out method.

Figure 14:
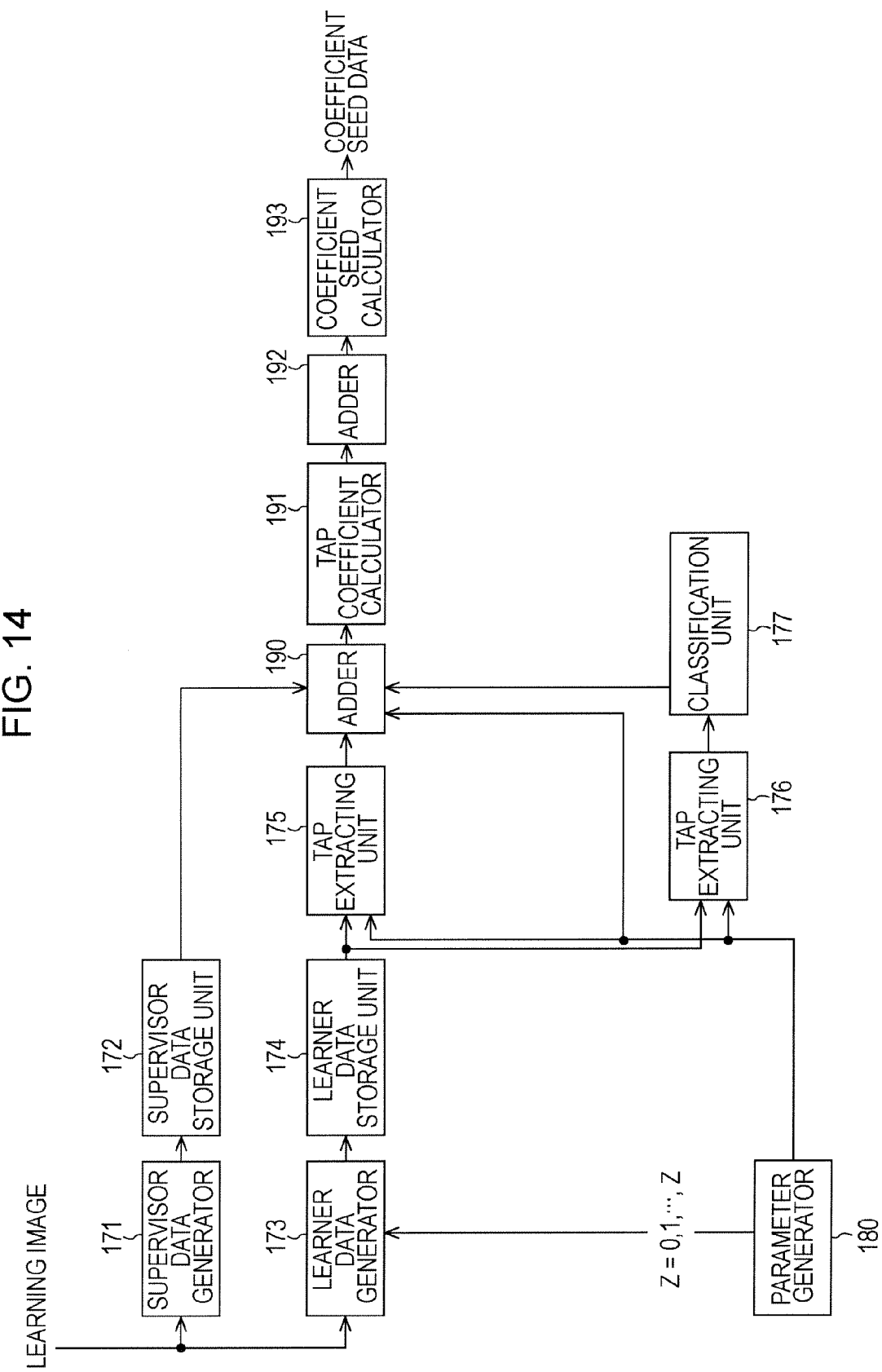
FIG. 14 is a block diagram illustrating another example of the configuration of the learning device for learning coefficient seed data.

FIG. 14 is another example of the configuration of the learning device for conducting learning for determining the coefficient seed data $\beta_{m,n}$ by solving the normal equations in equation (28). In FIG. 14, elements corresponding to those in FIG. 7 or 11 are designated with like reference numerals, and an explanation thereof is thus omitted.

The adder 190 receives a class code for the subject pixel output from the classification unit 177 and parameter z output from the parameter generator 180. The adder 190 then reads the subject pixel from the supervisor data storage unit 172, and performs addition for the subject pixel and the learner data, which forms the prediction taps supplied from the tap extracting unit 175, for each class code supplied from the classification unit 177 and for each value of the parameter z output from the parameter generator 180.

That is, the adder 190 receives supervisor data $y_k$ stored in the supervisor data storage unit 172, prediction taps $x_{n,k}$ output from the tap extracting unit 175, class code output from the classification unit 177, and parameter z, corresponding to the learner data and used for determining the prediction taps $x_{n,k}$, output from the parameter generator 180.

The adder 190 then performs calculations, such as multiplications ($x_{n,k} x_{n',k}$) of learner data and summations ($\Sigma$) in the matrix of the left side in equation (8) by using the prediction taps (learner data) $x_{n,k}$ for each class corresponding to the class code supplied from the classification unit 177 and for each value of the parameter z output from the parameter generator 180.

The adder 190 also performs calculations, such as multiplications ($x_{n,k} y_k$) of learner data $x_{n,k}$ and supervisor data $y_k$ and summations ($\Sigma$) in the vector of the right side in equation (8) by using the prediction taps (learner data) $x_{n,k}$ and the supervisor data $y_k$ for each class corresponding to the class code supplied from the classification unit 177 and for each value of the parameter z output from the parameter generator 180.

That is, the adder 190 stores in a built-in memory (not shown) the component ($\Sigma x_{n,k} x_{n',k}$) in the matrix of the left side and the component ($\Sigma x_{n,k} y_k$) in the vector of the right side in equation (8), which are determined for the previous subject pixel of the supervisor data, and then adds (addition represented by the summations in equation (8)) the corresponding component $x_{n,k+1} x_{n',k+1}$ or $x_{n,k+1} y_{k+1}$ calculated by using the supervisor data $y_{k+1}$ and the learner data $x_{n,k+1}$ for the current subject pixel of the supervisor data to the component ($\Sigma x_{n,k} x_{n',k}$) or the component ($\Sigma x_{n,k} y_k$), respectively.

The adder 190 performs the above-described addition on all the pixels of the supervisor data stored in the supervisor data storage unit 172 to establish the normal equations expressed by equation (8) for each class and for each value of the parameter z, and then supplies the normal equations to the tap coefficient calculator 191.

The tap coefficient calculator 191 solves the normal equations for each class and for each value of the parameter z supplied from the adder 190 to determine the optimal tap coefficient $w_n$ for each class, and supplies it to an adder 192.

The adder 192 performs addition for the variable $t_m$ corresponding to the parameter z and the optimal tap coefficient $w_n$ for each class.

That is, by using the variable $t_i(t_j)$ determined in equation (10) from the parameter z, the adder 192 performs calculations, such as multiplications ($t_i t_j$) of variables $t_i(t_j)$ corresponding to the parameter z and the summation ($\Sigma$) for each class for determining the component $X_{i,j}$, which is defined in equation (26), in the matrix of the left side in equation (28).

In this case, the component $X_{i,j}$ is determined only by the parameter z regardless of the class. Accordingly, it is sufficient if the component $X_{i,j}$ is calculated only once for all classes without calculating the component $X_{i,j}$ for each class.

By using the variable $t_i$ determined in equation (10) from the parameter z and the optimal tap coefficient $w_n$, the adder 192 also performs calculations, such as multiplications ($t_i w_n$) of variables $t_i$ corresponding to the parameter z and the optimal tap coefficient $w_n$, and the summation ($\Sigma$) for each class for determining the component $Y_i$, which is defined in equation (27), in the vector of the right side in equation (28).

The adder 192 establishes normal equations in equation (28) for each class by determining the component $X_{i,j}$ expressed by equation (26) and the component $Y_i$ expressed by equation (27), and then supplies the normal equations to a coefficient seed calculator 193.

The coefficient seed calculator 193 solves the normal equations in equation (28) for each class supplied from the adder 192 to determine the coefficient seed data $\beta_{m,n}$ for the corresponding class.

In the coefficient seed memory 167 of the image converter 48 shown in FIG. 9, the coefficient seed data $\beta_{m,n}$ for each class determined as described above is stored.

As discussed above, in the digital broadcasting receiver 2 shown in FIG. 3, the type of image data is determined by the determining unit 44, and if the type of image data is found to be quasi-HD image data, the quasi-HD image data is down-converted by reducing the number of pixels of the quasi-HD image data by the down-converter 45. Then, in the image converter 48, image conversion processing (hereinafter referred to as "classification adaptive processing") is performed by calculations using a tap coefficient for each class determined by learning, or using a tap coefficient for each class generated from coefficient seed data determined by learning and a predetermined parameter so that the down-converted SD image data can be converted into high quality HD image data.

Accordingly, the user of the digital broadcasting receiver 2 can receive high-quality image data.

As discussed with reference to FIG. 2, quasi-HD image data is merely image data obtained by converting NTSC composite signal image data into component signal image data and by up-converting the component signal image data by increasing the number of pixels of the component signal image data to that of HD image data captured by the HD camera 13. Accordingly, if the number of pixels of the component signal image data converted from the NTSC composite signal image data is ⅕ the number of pixels of the HD image data captured by the HD camera 13, the amount of information concerning five pixels of the quasi-HD image data is equal to the amount of information concerning only one pixel of the component signal image data converted from the NTSC composite signal image data.

Accordingly, roughly speaking, if classification adaptive processing is performed by using quasi-HD image data as the first image data, the number of pixels which is five times as large as that when classification adaptive processing is performed by using component signal image data converted from NTSC composite signal image data as the first image data should be used for performing calculations in equation (1) and classification. Otherwise, it would be difficult to obtain the performance comparable to that obtained when classification adaptive processing is performed by using component signal image data converted from NTSC composite signal image data as the first image data. The use of many pixels for performing calculations in equation (1) or classification increases the processing quantity.

Accordingly, as described above, quasi-HD image data is down-converted to SD image data by reducing the number of pixels of the quasi-HD image data in the down-converter 45, and then, in the image converter 48, classification adaptive processing is performed by using the SD image data as the first image data. As a result, high-quality image data can be obtained with a small processing quantity.

Additionally, as shown in FIG. 5, from among a plurality of sets of tap coefficients corresponding to a plurality of up-conversion techniques, one set of tap coefficients is selected based on channel information concerning the channel of image data, and classification adaptive processing is performed by using the selected set of tap coefficients. Alternatively, as shown in FIG. 9, a set of tap coefficients is generated by using channel information as a parameter z, and then, classification adaptive processing is performed by using the generated set of tap coefficients. With this arrangement, classification adaptive processing can be performed by using tap coefficients suitable for the up-conversion technique employed in the broadcasting station associated with the channel in which image data is broadcast. As a result, higher-quality image data can be obtained.

As well as quasi-HD image data, quasi-D1 image data is image data obtained by converting NTSC composite signal image data into component signal image data and by up-converting the component signal image data by increasing the number of pixels. However, since the number of pixels of quasi-D1 image data interpolated by up-conversion is smaller than that of quasi-HD image data, D1 image data and quasi-D1 image data are processed by the same image converter 47 of the digital broadcasting receiver 2 with no distinction. Alternatively, quasi-D1 image data can be processed in a manner similar to quasi-HD image data in distinction from D1 image data. More specifically, as in quasi-HD image data, quasi-D1 image data may be down-converted by decreasing the number of pixels to the number of pixels of image data obtained by converting NTSC composite signal image data into component signal image data, and then, classification adaptive processing is performed on the down-converted image data.

In the blocks including the determining unit 44, the down-converter 45, the image converters 46, 47, and 48, and the image output unit 49 shown in FIG. 3, processing can be executed on, not only broadcasting image data, but also, for example, image data played back from recording media.

A series of the above-described processing operations performed by the determining unit 44, the down-converter 45, and the image converter 48 may be executed by hardware or software. If software is used, a corresponding software program is installed into, for example, a general-purpose computer.

Figure 15:
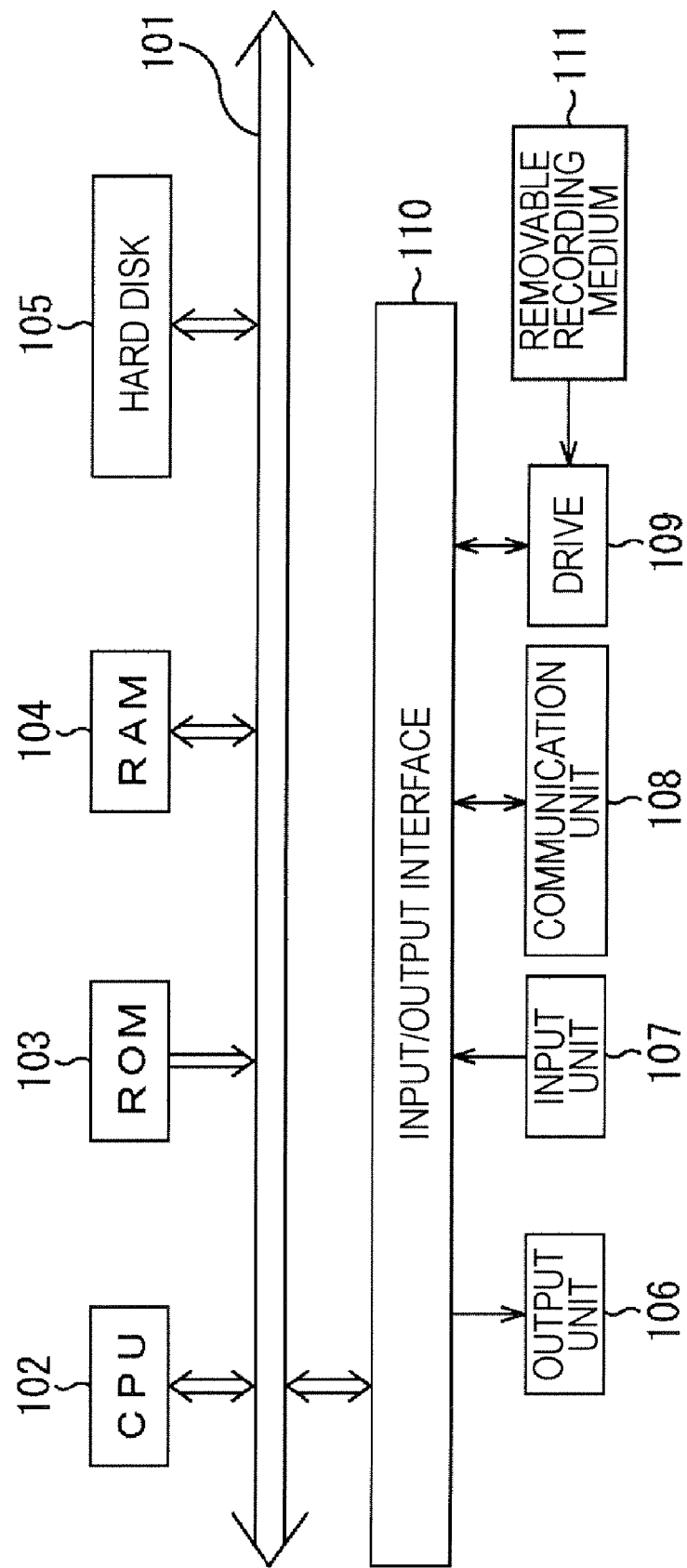
FIG. 15 is a block diagram illustrating the configuration of a computer according to an embodiment of the present invention.

FIG. 15 is a block diagram illustrating a computer into which a program executing the above-described series of processing operations is installed.

The program is prerecorded on a hard disk 105 or a read only memory (ROM) 103, which serves as a recording medium, built in the computer.

Alternatively, the program may be stored (recorded) temporarily or permanently on a removable recording medium 111, such as a flexible disk, a compact disc read only memory (CD-ROM), a magneto-optical (MO) disk, a digital versatile disc (DVD), a magnetic disk, or a semiconductor memory. Such removable disk 111 can be provided as so-called "package software".

As stated above, the program may be installed into a computer from the removable medium 111. Alternatively, the program may be transferred to the computer by wireless means from a download site via a digital satellite broadcasting artificial satellite, or by wired means via a network, such as a local area network (LAN) or the Internet. Then, the computer can receive the transferred program by a communication unit 108 and installs the program in the built-in hard disk 105.

The computer has a built-in central processing unit (CPU) 102. An input/output interface 110 is connected to the CPU 102 through a bus 101. Upon receiving an instruction from a user by operating an input unit 107, which includes a keyboard, a mouse, or a microphone, via the input/output interface 110, the CPU 102 executes a program stored in the ROM 103. Alternatively, the CPU 102 may load, into a random access memory (RAM) 104, a program stored in the hard disk 105, a program installed in the hard disk 105 after being transferred from a satellite or a network and received by the communication unit 108, or a program installed in the hard disk 105 after being read from the removable recording medium 111 installed in a drive 109, and executes such a loaded program. Then, the CPU 102 can execute the processing according to the above-described flowcharts or the processing performed by the elements shown in the block diagrams. Then, if necessary, the CPU 102 outputs the processing results from an output unit 106, which includes a liquid crystal display (LCD) or a speaker, or sends the processing results from the communication unit 108, or records them in the hard disk 105 via the input/output interface 110.

In this specification, it is not necessary that steps forming a program allowing a computer to execute various processing operations be executed in chronological order indicated in the flowcharts. Alternatively, they may be executed in parallel or individually (e.g., by parallel processing or object processing).

The program may be executed by a single computer or may be executed as distributed processing by a plurality of computers.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for processing first image data to output second image data which has higher quality than the first image data, comprising:
   down-converting means for down-converting input image data by decreasing the number of pixels of the input image data;
   image conversion means for converting the first image data into the second image data by using the input image data down-converted by the down-converting means as the first image data; and
   determining means for determining a type of the input image data, in case the determining means determines that the type of the input image data is up-converted image data obtained by up-converting image data by increasing a number of pixels of the image data, the down-converting means down-converts the input image data by decreasing the number of pixels of the input image data,
   wherein the image conversion means includes
      prediction tap extracting means for extracting, as prediction taps, a plurality of pixels used for predicting a subject pixel of the second image data from the first image data,
      class tap extracting means for extracting, as class taps, a plurality of pixels used for classifying the subject pixel into one of a plurality of classes from the first image data,
      classification means for classifying the subject pixel based on the class taps,
      coefficient output means for outputting a coefficient corresponding to the class of the subject pixel from among coefficients corresponding to the plurality of classes, the coefficients being determined beforehand by learning, and
      calculation means for determining the subject pixel by performing prediction calculations by using the coefficient corresponding to the class of the subject pixel and the prediction taps.

2. The image processing apparatus according to claim 1, wherein the input image data is broadcasting image data.

3. The image processing apparatus according to claim 2, further comprising selection means for selecting, from among a plurality of sets of coefficients associated with a plurality of corresponding up-conversion techniques used by the up-conversion, a set of coefficients based on channel information concerning a channel of the broadcasting image data,
   wherein the coefficient output means outputs a coefficient corresponding to the class of the subject pixel from among the set of coefficients selected by the selection means.

4. An image processing method for processing first image data to output second image data which has higher quality than the first image data, comprising the steps of:
   down-converting input image data by decreasing the number of pixels of the input image data;
   converting the first image data into the second image data by using the down-converted image data as the first image data; and
   determining a type of the input image data, and in case it is determined that the type of the input image data is up-converted image data obtained by up-converting image data by increasing a number of pixels of the image data, said converting down-converts the input image data by decreasing the number of pixels of the input image data,
   wherein converting the first image data into the second image data includes the steps of
      extracting, as prediction taps, a plurality of pixels used for predicting a subject pixel of the second image data from the first image data,
      extracting, as class taps, a plurality of pixels used for classifying the subject pixel into one of a plurality of classes from the first image data,
      classifying the subject pixel based on the class taps,
      outputting a coefficient corresponding to the class of the subject pixel from among coefficients corresponding to the plurality of classes, the coefficients being determined beforehand by learning, and
      determining the subject pixel by performing prediction calculations by using the coefficient corresponding to the class of the subject pixel and the prediction taps.

5. A computer readable medium having computer instructions recorded thereon, the computer instructions configured to make a computer execute a method of image processing for processing first image data to output second image data which has higher quality than the first image data, the method comprising the steps of:
   down-converting input image data by decreasing the number of pixels of the input image data;
   converting the first image data into the second image data by using the down-converted image data as the first image data; and
   determining a type of the input image data, and in case it is determined that the type of the input image data is up-converted image data obtained by up-converting image data by increasing a number of pixels of the image data, said converting down-converts the input image data by decreasing the number of pixels of the input image data, wherein converting the first image data into the second image data includes the steps of extracting, as prediction taps, a plurality of pixels used for predicting a subject pixel of the second image data from the first image data, extracting, as class taps, a plurality of pixels used for classifying the subject pixel into one of a plurality of classes from the first image data, classifying the subject pixel based on the class taps, outputting a coefficient corresponding to the class of the subject pixel from among coefficients corresponding to the plurality of classes, the coefficients being determined beforehand by learning, and determining the subject pixel by performing prediction calculations by using the coefficient corresponding to the class of the subject pixel and the prediction taps.

6. An image processing apparatus for processing first image data to output second image data which has higher quality than the first image data, comprising:

down-converting means for down-converting input image data by decreasing the number of pixels of the input image data; and image conversion means for converting the first image data into the second image data by using the input image data down-converted by the down-converting means as the first image data, wherein the image conversion means includes prediction tap extracting means for extracting, as prediction taps, a plurality of pixels used for predicting a subject pixel of the second image data from the first image data, class tap extracting means for extracting, as class taps, a plurality of pixels used for classifying the subject pixel into one of a plurality of classes from the first image data, classification means for classifying the subject pixel based on the class taps, generating means for generating a coefficient corresponding to each of the plurality of classes from a predetermined parameter and seed data, which serves as a seed for the coefficient and which is determined beforehand by learning, coefficient output means for outputting a coefficient corresponding to the class of the subject pixel from among the coefficients corresponding to the plurality of classes generated by the generating means, and calculation means for determining the subject pixel by performing prediction calculations by using the coefficient corresponding to the class of the subject pixel and the prediction taps.

7. The image processing apparatus according to claim 6, further comprising determining means for determining the type of the input image data, wherein, if the determining means determines that the type of the input image data is up-converted image data obtained by up-converting another image data by increasing the number of pixels of said another image data, the down-converting means down-converts the input image data by decreasing the number of pixels of the input image data.

8. The image processing apparatus according to claim 7, wherein the input image data is broadcasting image data.

9. The image processing apparatus according to claim 8, wherein the generating means generates the coefficient corresponding to each of the plurality of classes by using channel information concerning a channel of the broadcasting image data as the predetermined parameter.

10. An image processing method for processing first image data to output second image data which has higher quality than the first image data, comprising the steps of:

down-converting input image data by decreasing the number of pixels of the input image data; and converting the first image data into the second image data by using the down-converted image data as the first image data, wherein converting the first image data into the second image data includes the steps of extracting, as prediction taps, a plurality of pixels used for predicting a subject pixel of the second image data from the first image data, extracting, as class taps, a plurality of pixels used for classifying the subject pixel into one of a plurality of classes from the first image data, classifying the subject pixel based on the class taps, generating a coefficient corresponding to each of the plurality of classes from a predetermined parameter and seed data, which serves as a seed for the coefficient and which is determined beforehand by learning, outputting a coefficient corresponding to the class of the subject pixel from among the generated coefficients corresponding to the plurality of classes, and determining the subject pixel by performing prediction calculations by using the coefficient corresponding to the class of the subject pixel and the prediction taps.

11. A program allowing a computer to execute image processing for processing first image data to output second image data which has higher quality than the first image data, comprising the steps of:

down-converting input image data by decreasing the number of pixels of the input image data; and converting the first image data into the second image data by using the down-converted image data as the first image data, wherein converting the first image data into the second image data includes the steps of extracting, as prediction taps, a plurality of pixels used for predicting a subject pixel of the second image data from the first image data, extracting, as class taps, a plurality of pixels used for classifying the subject pixel into one of a plurality of classes from the first image data, classifying the subject pixel based on the class taps, generating a coefficient corresponding to each of the plurality of classes from a predetermined parameter and seed data, which serves as a seed for the coefficient and which is determined beforehand by learning, outputting a coefficient corresponding to the class of the subject pixel from among the generated coefficients corresponding to the plurality of classes, and determining the subject pixel by performing prediction calculations by using the coefficient corresponding to the class of the subject pixel and the prediction taps.

12. An image processing apparatus for processing first image data to output second image data which has higher quality than the first image data, comprising:

a down-converter configured to down-convert input image data by decreasing the number of pixels of the input image data;

an image converter configured to convert the first image data into the second image data by using the input image data down-converted by the down-converter as the first image data; and a determining unit configured to determine a type of the input image data, in case the determining unit determines that the type of the input image data is up-converted image data obtained by up-converting image data by increasing a number of pixels of the image data, the down-converter down-converts the input image data by decreasing the number of pixels of the input image data, wherein the image converter includes a prediction tap extracting unit configured to extract, as prediction taps, a plurality of pixels used for predicting a subject pixel of the second image data from the first image data, a class tap extracting unit configured to extract, as class taps, a plurality of pixels used for classifying the subject pixel into one of a plurality of classes from the first image data, a classification unit configured to classify the subject pixel based on the class taps, a coefficient output unit configured to output a coefficient corresponding to the class of the subject pixel from among coefficients corresponding to the plurality of classes, the coefficients being determined beforehand by learning, and a calculator configured to determine the subject pixel by performing prediction calculations by using the coefficient corresponding to the class of the subject pixel and the prediction taps.

13. An image processing apparatus for processing first image data to output second image data which has higher quality than the first image data, comprising:

a down-converter configured to down-convert input image data by decreasing the number of pixels of the input image data; and an image converter configured to convert the first image data into the second image data by using the input image data down-converted by the down-converter as the first image data, wherein the image converter includes a prediction tap extracting unit configured to extract, as prediction taps, a plurality of pixels used for predicting a subject pixel of the second image data from the first image data, a class tap extracting unit configured to extract, as class taps, a plurality of pixels used for classifying the subject pixel into one of a plurality of classes from the first image data, a classification unit configured to classify the subject pixel based on the class taps, a generator configured to generate a coefficient corresponding to each of the plurality of classes from a predetermined parameter and seed data, which serves as a seed for the coefficient and which is determined beforehand by learning, a coefficient output unit configured to output a coefficient corresponding to the class of the subject pixel from among the coefficients corresponding to the plurality of classes generated by the generator, and a calculator configured to determine the subject pixel by performing prediction calculations by using the coefficient corresponding to the class of the subject pixel and the prediction taps.

* * * * *